(12) United States Patent
Wan et al.

(10) Patent No.: US 11,917,198 B2
(45) Date of Patent: Feb. 27, 2024

(54) METHOD AND DEVICE FOR INTRA PREDICTION

(71) Applicant: GUANGDONG OPPO MOBILE TELECOMMUNICATIONS CORP., LTD., Dongguan (CN)

(72) Inventors: Shuai Wan, Dongguan (CN); Zhecheng Wang, Dongguan (CN); Fuzheng Yang, Dongguyan (CN); Yanzhuo Ma, Dongguan (CN); Junyan Huo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/950,860

(22) Filed: Sep. 22, 2022

(65) Prior Publication Data

US 2023/0009083 A1  Jan. 12, 2023

Related U.S. Application Data

(63) Continuation of application No. PCT/CN2020/080965, filed on Mar. 24, 2020.

(51) Int. Cl.
*H04N 19/593* (2014.01)
*H04N 19/96* (2014.01)

(52) U.S. Cl.
CPC .................... *H04N 19/593* (2014.11)

(58) Field of Classification Search
CPC ....... H04N 19/593; H04N 19/597; G06T 9/40
See application file for complete search history.

(56) References Cited

U.S. PATENT DOCUMENTS

| 11,206,426 B2* | 12/2021 | Sugio ...................... G06T 9/001 |
| 11,742,878 B2* | 8/2023 | Zhang .................... H04N 19/96 |
| | | 341/899 |

(Continued)

FOREIGN PATENT DOCUMENTS

| BR | 112020024052 A2 | 2/2021 |
| CN | 110418135 A | 11/2019 |

(Continued)

OTHER PUBLICATIONS

Octree-based point cloud compression; Schnabel—2006. (Year: 2006).*

(Continued)

*Primary Examiner* — Luis Perez-Fuentes
(74) *Attorney, Agent, or Firm* — BAYES PLLC

(57) ABSTRACT

A method and device for intra prediction are provided. The method includes: when determining that a current level obtained by partitioning an input point cloud is lower than a target level, obtaining occupation information of a first number of neighbouring nodes of a current node; extracting occupation information of a second number of neighbouring nodes from the occupation information of the first number of neighbouring nodes, the first number being greater than the second number, and the second number of neighbouring nodes being in an association relationship with a child node of the current node, and performing intra prediction on occupation information of the child node of the current node based on the occupation information of the second number of neighbouring nodes to obtain a first prediction result.

17 Claims, 16 Drawing Sheets

(56) References Cited

U.S. PATENT DOCUMENTS

| | | | |
|---|---|---|---|
| 2020/0137399 | A1 | 4/2020 | Li et al. |
| 2021/0099697 | A1* | 4/2021 | Sugio .................... H04N 19/96 |
| 2021/0217206 | A1* | 7/2021 | Flynn .................... G06T 9/001 |
| 2021/0272324 | A1 | 9/2021 | Lasserre |
| 2022/0159310 | A1* | 5/2022 | Oh ...................... H04N 19/136 |
| 2022/0159312 | A1* | 5/2022 | Oh ........................ H04N 19/70 |
| 2022/0247427 | A1* | 8/2022 | Zhang ................. H03M 7/6011 |
| 2022/0286713 | A1* | 9/2022 | Oh ............................ G06T 9/00 |
| 2022/0345695 | A1* | 10/2022 | Wan ..................... H04N 19/597 |
| 2022/0417557 | A1* | 12/2022 | Oh ........................... G06T 9/001 |

FOREIGN PATENT DOCUMENTS

| | | |
|---|---|---|
| EP | 3514967 A1 | 7/2019 |
| EP | 3595180 A1 | 1/2020 |
| EP | 3595181 A1 | 1/2020 |
| EP | 3800886 A1 | 4/2021 |
| WO | 2019070952 A1 | 4/2019 |
| WO | 2019079397 A1 | 4/2019 |
| WO | 2019195920 A1 | 10/2019 |
| WO | 2019213986 A1 | 11/2019 |
| WO | 2020004461 A1 | 1/2020 |

OTHER PUBLICATIONS

Neighbor-dependent entropy coding of occupancy patterns; Lasserre, 2018 (Year: 2018).*
Simplification of neighbor-dependent entropy coding in CE3.4; Wang, 2018 (Year: 2018).*
Enhanced intra prediction scheme in point cloud attribute compression; 2019 (Year: 2019).*
Hybrid Octree-Plane point cloud geometry coding;—Dricot—2019. (Year: 2019).*
Wei, Honglian et al. "Enhanced Intra Prediction Scheme in Point Cloud Attribute Compression", IEEE, Dec. 31, 2019 (Dec. 31, 2019), entire document.
Dricot. Antonie et al. "Hybrid Octree-Plane Point Cloud Geometry Coding" IEEE, Dec. 31, 2019 (Dec. 31, 2019), entire document.
Dricot, Antonie et al. "Adaptive Multi-level Triangle Soup for Geometry-based Point Cloud Coding" IEEE, Dec. 31, 2019 (Dec. 31, 2019), entire document.
International Search Report in the international application No. PCT/CN2020/080965, dated Dec. 28, 2020.
English translation of the Written Opinion of the International Search Authority in the international application No. PCT/CN2020/080965, dated Dec. 28, 2020.
International Search Report in the international application No. PCT/CN2020/070557, dated Sep. 30, 2020.
English translation of the Written Opinion of the International Search Authority in the international application No. PCT/CN2020/070557, dated Sep. 30, 2020.

First Office Action of the Indian application No. 202227039416, dated Oct. 27, 2022.
Non-final Office Action of the U.S. Appl. No. 17/857,789, dated Jan. 10, 2023.
Final Office Action of the U.S. Appl. No. 17/857,789, dated Apr. 21, 2023.
Advisory Action of the U.S. Appl. No. 17/857,789, dated Jul. 5, 2023, 5 pages.
Chi Wang (Panasonic) et al:"PCC Simplification of neighbour-dependent entropy coding in CE3.4", 122. MPEG Meeting;Apr. 16, 2018-Apr. 20, 2018; San Diego; (Motion Picture Expertgroup or ISO/IEC JTC1 /SC29/WG11 ), No. m42689 Apr. 13, 2018(Apr. 13, 2018), XP030261656, abstract; figures 1-5, sections 1-5, 7 pages.
Zink Michael et al: "Using neighbouring nodes for the compression of octrees representing the geometry of point clouds", Proceedings of the 10th ACM Multimedia Systems Conference, Jun. 18, 2019 (Jun. 18, 2019), pp. 145-153, XP055870050, section 6, 9 pages.
Lasserre (Blackberry) S et al: "[PCC] An overview of OBUF and neighbour usage for geometry coding", 125. MPEG Meeting; Jan. 14, 2019-Jan. 18, 2019; Marrakech (Motion Picture Expert Group or ISO/IEC JTC1/sc29/WG11), No. m458113 Jan. 2019 (Jan. 3, 2019), XP030198272, section 6, 15 pages.
"G-PCC codec description v4", 127. MPEG Meeting; Jul. 8, 2019-Jul. 12, 2019; Gothenburg; (Motion Picture Expert Group or ISO/IEC JTC1/SC29/WG11), No. N18673, Sep. 6, 2019 (Sep. 6, 2019), XP030206833, sections 3.2.2.6 and 3.2.3, 62 pages.
Supplementary European Search Report in the European application No. 20911782.9, dated Aug. 4, 2023, 10 pages.
"Khaled Mammou, Philip A. Chou, David Flynn, Maja Krivokuca, Ohji Nakagami and Toshiyasu Sugio, G-PCC codec description v2", ISO/IEC JTC1/SC29/WG11 N18189, ISO/IEC JTC1/SC29/WG11, Jan. 2019, 13 pages.
First Office Action of the Japanese application No. 2022-541650, dated Oct. 17, 2023, 10 pages with English translation.
Shuai Wan et al: "[G-PCC] [ New proposal] On geometry occupancy intra prediction", 129. MPEG Meeting; Jan. 13, 2020-Jan. 17, 2020; Brussels; (Motion Picture Expert Group or ISO/IEC JTC1/sc29/wG11), No. m52327Jan. 11, 2020 (Jan. 11, 2020), XP030224955, [ retrieved on Jan. 11, 2020], sections 1 and 2, 4 pages.
"G-PCC codec description v5", 128. MPEG Meeting; Oct. 7, 2019-Oct. 11, 2019; Geneva; (Motion Picture Expert Group or IsO/IEC JTC1/sc29/wG11). No. n18891, Dec. 18, 2019 (Dec. 18, 2019), XP030225589,[ retrieved on Dec. 18, 2019], section 3.2.3-3.2.3.2, 74 pages.
Shuai Wan et al:"[G-PCC] CE13.11 report on Intra occupancy prediction" 130. MPEG Meeting; Apr. 20, 2020-Apr. 24, 2020;Alpbach; (Motion Picture Expert Group or IsO/IEC JTC1/sc29/wG11), No. m53328, Apr. 16, 2020 (Apr. 16, 2020), XP030286573,[retrieved on Apr. 16, 2020], section 2, in particular p. 2, lines 1-4, 7 pages.
Supplementary European Search Report in the European application No. 20927585.8, dated Jan. 5, 2024, 13 pages.

* cited by examiner

| Test sequence | Geometrical BD-TotalRate (%) | |
|---|---|---|
| | D1 | D2 |
| basketball_player_vox11_00000200 | -1.9% | -1.9% |
| boxer_viewdep_vox12 | -1.5% | -1.5% |
| dancer_vox11_00000001 | -1.6% | -1.6% |
| longdress_viewdep_vox12 | -1.3% | -1.3% |
| longdress_vox10_1300 | -1.2% | -1.3% |
| loot_viewdep_vox12 | -1.5% | -1.5% |
| loot_vox10_1200 | -1.5% | -1.6% |
| queen_0200 | -1.4% | -1.5% |
| redandblack_viewdep_vox12 | -1.2% | -1.2% |
| redandblack_vox10_1550 | -1.2% | -1.2% |
| soldier_viewdep_vox12 | -1.2% | -1.2% |
| soldier_vox10_0690 | -1.1% | -1.1% |
| thaidancer_viewdep_vox12 | -1.5% | -1.5% |
| overall | -1.39% | -1.42% |

FIG. 12

| Test sequence | Geometrical bpip ratio (%) |
|---|---|
| | D1 |
| basketball_player_vox11_00000200 | 98.4% |
| boxer_viewdep_vox12 | 96.9% |
| dancer_vox11_00000001 | 98.5% |
| longdress_viewdep_vox12 | 97.2% |
| longdress_vox10_1300 | 99.1% |
| loot_viewdep_vox12 | 97.1% |
| loot_vox10_1200 | 98.9% |
| queen_0200 | 99.3% |
| redandblack_viewdep_vox12 | 97.7% |
| redandblack_vox10_1550 | 99.1% |
| soldier_viewdep_vox12 | 97.5% |
| soldier_vox10_0690 | 99.1% |
| thaidancer_viewdep_vox12 | 98.6% |
| overall | 98.26% |

FIG. 13

METHOD AND DEVICE FOR INTRA PREDICTION

CROSS-REFERENCE TO RELATED APPLICATION

This application is a continuation of International Application No. PCT/CN2020/080965, filed on Mar. 24, 2020, the contents of which are incorporated herein by reference in its entirety.

BACKGROUND

At present, in an intra prediction solution for octree-based geometric information encoding in a related art, occupation information of 26 neighbouring nodes of a current node and multiple preset thresholds are used for calculation and comparison.

It is to be noted that, when the above-mentioned prediction solution is used for intra prediction, more Look Up Tables (LUTs) are involved, and moreover, intra prediction at least involves the setting of 16 weights and 10 thresholds.

As a result, it is hard to find an optimal solution and impossible to obtain an optimal intra prediction result. Thus, it can be seen that intra prediction in the related art has the problems of large calculation amount, relatively long encoding/decoding time, and inaccurate intra prediction result.

SUMMARY

Embodiments of the application relate to encoding and decoding technologies in the field of communications, and particularly to a method and apparatus for intra prediction, an encoder, a decoder, and a storage medium.

The embodiments of the application provide a method and apparatus for intra prediction, an encoder, a decoder, and a storage medium, thereby improving the speed and accuracy of intra prediction during encoding/decoding and further improving the encoding/decoding quality.

The technical solutions of the embodiments of the application may be implemented as follows.

In a first aspect, the embodiments of the application provide a method for intra prediction, which may include the following operations.

Occupation information of a first number of neighbouring nodes of a current node is obtained in response to determining that a present level obtained by partitioning an input point cloud is lower than a target level.

The occupation information of a second number of neighbouring nodes is extracted from the occupation information of the first number of neighbouring nodes, the first number being greater than the second number, and the second number of neighbouring nodes being in an association relationship with a child node of the current node.

Intra prediction is performed on occupation information of the child node of the current node based on the occupation information of the second number of neighbouring nodes to obtain a first prediction result.

In a second aspect, the embodiments of the application provide a method for intra prediction, which may include the following operations.

Occupation information of a first number of neighbouring nodes of a current node and first occupation numbers respective corresponding to each neighbouring node of the first number of neighbouring nodes are obtained in response to determining that a present level obtained by partitioning an input point cloud is lower than a target level.

Second occupation numbers respective corresponding to each neighbouring node of a second number of neighbouring nodes is obtained, the first number being greater than the second number, and the second number of neighbouring nodes being in an association relationship with a child node of the current node.

Intra prediction is performed on occupation information of the child node of the current node based on the occupation information of the first number of neighbouring nodes of the current node, the first occupation numbers, and the second occupation numbers to obtain a first prediction result.

In a third aspect, the embodiments of the application also provide an apparatus for intra prediction, which may include a first processing module, a first extraction module, and a second processing module.

The first processing module may be configured to obtain occupation information of a first number of neighbouring nodes of a current node in response to determining that a present level obtained by partitioning an input point cloud is lower than a target level.

The first extraction module may be configured to extract the occupation information of a second number of neighbouring nodes from the occupation information of the first number of neighbouring nodes, the first number being greater than the second number, and the second number of neighbouring nodes being in an association relationship with a child node of the current node.

The second processing module may be configured to perform intra prediction on occupation information of the child node of the current node based on the occupation information of the second number of neighbouring nodes to obtain a first prediction result.

In a fourth aspect, the embodiments of the application also provide an apparatus for intra prediction, which may include a third processing module, a first obtaining module, and a fourth processing module.

The third processing module may be configured to obtain occupation information of a first number of neighbouring nodes of a current node and first occupation numbers respective corresponding to each neighbouring node of the first number of neighbouring nodes in response to determining that a present level obtained by partitioning an input point cloud is lower than a target level.

The first obtaining module may be configured to obtain second occupation numbers respective corresponding to each neighbouring node of a second number of neighbouring nodes, the first number being greater than the second number, and the second number of neighbouring nodes being in an association relationship with a child node of the current node.

The fourth processing module may be configured to perform intra prediction on occupation information of the child node of the current node based on the occupation information of the first number of neighbouring nodes of the current node, the first occupation numbers, and the second occupation numbers to obtain a first prediction result.

In a fifth aspect, the embodiments of the application provide an encoder, which may include a first memory and a first processor.

The first memory may be configured to store executable intra prediction instructions.

The first processor may be configured to execute the executable intra prediction instructions stored in the first memory to implement the intra prediction method as described in the first aspect.

In a sixth aspect, the embodiments of the application provide a decoder, which may include a second memory and a second processor.

The second memory may be configured to store executable intra prediction instructions.

The second processor may be configured to execute the executable intra prediction instructions stored in the second memory to implement the intra prediction method as described in the second aspect.

In a seventh aspect, the embodiments of the application provide a computer-readable storage medium, which may store executable intra prediction instructions executed by a first processor to implement the intra prediction method as described in the first aspect.

BRIEF DESCRIPTION OF THE DRAWINGS

FIG. 12 shows a BD-Rate under lossy compression according to embodiments of the application.

FIG. 13 shows a bpip ratio under lossless compression according to embodiments of the application.

DETAILED DESCRIPTION

In order to make the objectives, technical solutions, and advantages of the embodiments of the application clearer, specific technical solutions of the application will further be described below in combination with the drawings in the embodiments of the application in detail. The following embodiments are used to describe the application rather than limit the scope of the application.

Unless otherwise defined, all technical and scientific terms used herein have the same meanings as commonly understood by those skilled in the art the application belongs to. Terms used herein are only for a purpose of describing the embodiments of the application and not intended to limit the application.

"Some embodiments" involved in the following descriptions describes a subset of all possible embodiments. However, it can be understood that "some embodiments" may be the same or different subsets of all the possible embodiments, and may be combined with one another without conflicts.

It is to be pointed out that term "first/second/third" involved in the embodiments of the application is only for distinguishing similar objects and does not represent a specific sequence of the objects. It can be understood that "first/second/third" may be interchanged according to specific sequences or orders if allowed such that the embodiments of the application described herein may be implemented in sequences except the those illustrated or described herein.

Nouns and terms involved in the embodiments of the application will be described before the embodiments of the application are further described in detail. The nouns and terms involved in the embodiments of the application are suitable to be explained as follows:
1) Point Cloud Compression (PCC)
2) Geometry-based Point Cloud Compression (G-PCC)
3) Slice
4) Bounding box
5) Octree
6) Intra prediction
7) Triangle Soup (trisoup)
8) Context-based Adaptive Binary Arithmetic Coding (CABAC)
9) Block
10) Vertex
11) Red-Green-Blue (RGB)
12) Luminance-Chrominance (YUV)
13) Level of Detail (LOD)
14) Region Adaptive Hierarchical Transform (RAHT)
15) Look Up Table (LUT)
16) Moving Picture Experts Group (MPEG)
17) International Standardization Organization (ISO)
18) International Electrotechnical Commission (IEC)
19) Number of occupied neighbours (No) in neighbouring nodes In the embodiments of the application, in a G-PCC coder framework, after slice partition is performed on a point cloud input to a Three-Dimensional (3D) image model, each slice is coded independently.

Figure 1:
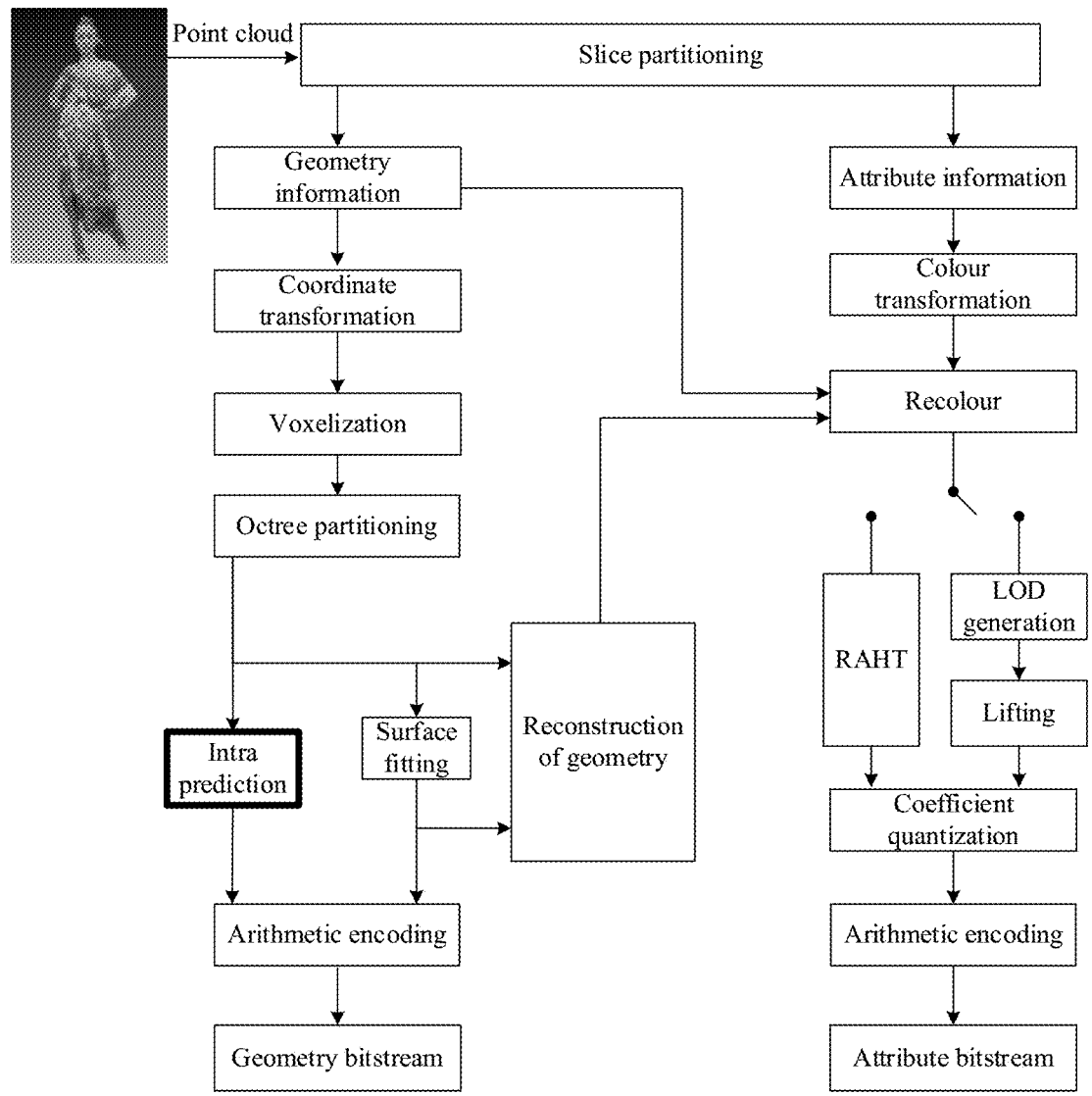
FIG. 1 is an exemplary block diagram of a coding process according to embodiments of the application.

In a block diagram of a G-PCC coding process shown in FIG. 1, after slice partition is performed on an input point cloud, each slice is coded independently. In each slice, geometry information of the point cloud and attribute information corresponding to each point are coded separately. First, coordinate transformation is performed on the geometry information so as to include the whole point cloud in a bounding box. Then, quantization is performed. The operation of quantization mainly plays the role of scaling. Rounding in quantization makes the geometry information corresponding to a part of points the same. Whether to remove duplicate points is determined based on parameters.

The process of quantization and removal of the duplicate points is also referred to as a voxelization process. Next, octree-based partition is performed on the bounding box. According to different depths of octree division levels, the coding of geometry information is classified as two frameworks respectively based on octree and trisoup.

In the octree-based geometry information coding framework, the bounding box is equally partitioned into eight sub-cubes, and occupation information of each sub-cube is recorded (1 represents nonempty, and 0 represents empty).

A nonempty sub-cube continues to be equally partitioned into eight parts. Partition is stopped when a leaf node obtained by partition is a 1×1×1 unit cube. In this process, intra prediction is performed on the occupation information by use of a spatial correlation between a node and a surrounding node. Finally, CABAC is performed to generate a binary bitstream.

In the trisoup-based geometry information coding framework, octree-based partition is also performed first. However, different from the octree-based geometry information coding, the trisoup-based geometry information coding does not need to partition the point cloud into until unit cubes with a side length of 1×1×1 level by level, and instead, partition is stopped when a side length of a block is W.

Based on a surface formed by the distribution of a point cloud in each block, at most 12 vertexes generated by 12 sides of the surface and the block are obtained. Vertex coordinates of each block are coded sequentially to generate a binary bitstream.

The geometry information is reconstructed after geometry coding. At present, attribute coding is performed mainly for colour information. First, the colour information is transformed from an RGB colour space to a YUV colour space. Then, the point cloud is recoloured by use of the reconstructed geometry information so as to achieve a correspondence between the uncoded attribute information and the reconstructed geometry information.

There are mainly two transform methods for the coding of the colour information: one is distance-based lifting transformation dependent of LOD partition, and the other is performing RAHT directly.

By both methods, the colour information may be transformed from a space domain to a frequency domain. A high-frequency coefficient and a low-frequency coefficient are obtained by transformation. Finally, the coefficients are quantized and coded to generate a binary bitstream.

Here, intra prediction for octree-based geometry information coding is described.

Prediction, i.e., intra prediction, is performed on whether a child node of a current node is occupied according to occupation information of 26 neighbouring nodes of the current node. The implementation of intra prediction is described as follows.

First, intra prediction is enabled when a present level of octree partition is lower than a preset level L. An input is a Morton 3D map for mapping an (x, y, z) coordinate and a flag bit, a map shift parameter, and a coordinate of an origin of the current node.

Then, a weight value $W(d_{k,m}, \delta_k)$ is set according to the occupation information $\delta_k$ of a neighbouring node k and a distance $d_{k,m}$ between the neighbouring node k and the child node of the current node:

$$W(d_{k,m}, \delta_k) = \begin{cases} W0(d_{k,m}) & \text{if } \delta_k = 0 \\ W1(d_{k,m}) & \text{if } \delta_k = 1 \end{cases}$$

Next, 26 weights are averaged to obtain a corresponding score $score_m$:

$$score_m = \frac{1}{26}\sum_{k=1}^{26} W(d_{k,m}, \delta_k)$$

Later on, two sets of thresholds $th_0(No)$ and $th_1(No)$ related to No (number of occupied neighbours) in the neighbouring nodes are set. It is predicted that the node is "unoccupied" when $score_m$ is less than or equal to $th_0(No)$ and the node is "occupied" when $score_m$ is more than or equal to $th_1(No)$. Otherwise, "skip prediction" is obtained.

Finally, "whether to perform prediction" and "prediction value" represented by 0 or 1 are output for subsequent entropy coding of occupation information. Here, 1, 1 represents "occupied", 1, 0 represents "unoccupied", and 0, 0 represents "skip prediction".

Here, values of $W0(d_{k,m})$, $W1(d_{k,m})$, $th_0(No)$, and $th_1(No)$ are all obtained by training. They are preset fixed values in an encoder and a decoder, and need not to be transmitted by the encoder to the decoder. Processes, frameworks, and algorithms of the technical solution at the encoder and the decoder are completely the same.

It is to be noted that the technical solution of intra prediction for octree-based geometry information coding at least has the following defect. The occupation information of the 26 neighbouring nodes of the current node is used. 1 represents nonempty, and 0 represents empty. Then, calculation and comparison are performed according to $W0(d_{k,m})$, $W1(d_{k,m})$, $th_0(No)$, and $th_1(No)$.

Finally, three kinds of prediction results are obtained. In the solution, more LUTs are involved, and 16 weights and 10 thresholds are set. As a result, it is hard to find an optimal solution and impossible to obtain an optimal intra prediction result.

In addition, considering that some neighbouring nodes hardly affect a certain child node of the current node, prediction with all of the 26 neighbours brings excessive calculations, thereby prolonging the encoding/decoding time.

The embodiments of the application provide a method and apparatus for intra prediction, an encoder, a decoder, and a storage medium.

The method includes the following operations. Occupation information of a first number of neighbouring nodes of a current node is obtained in response to determining that a present level obtained by partitioning an input point cloud is lower than a target level.

The occupation information of a second number of neighbouring nodes is extracted from the occupation information of the first number of neighbouring nodes, the first number being greater than the second number, and the second number of neighbouring nodes being in an association relationship with a child node of the current node.

Intra prediction is performed on occupation information of the child node of the current node based on the occupation information of the second number of neighbouring nodes to obtain a first prediction result. That is, in the embodiments of the application, when intra prediction is performed on the occupation information of the child node of the current node, only the second number of neighbouring nodes in an association relationship with the child node of the current node are considered. Therefore, the aims of reducing LUTs and the calculation complexity, improving the accuracy of an intra prediction result, shortening the encoding/decoding time, and improving the encoding/decoding accuracy are fulfilled.

Figure 2:
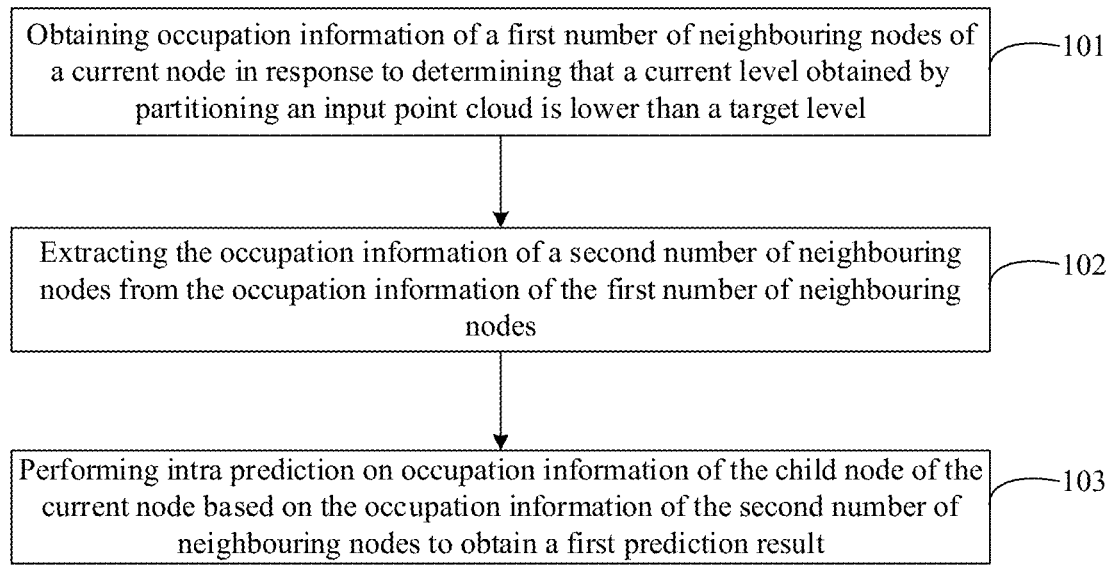
FIG. 2 is a first exemplary flowchart of a method for intra prediction according to embodiments of the application.

Embodiments of the application provide a method for intra prediction. Referring to FIG. 2, the method includes the following operations.

In S101, occupation information of a first number of neighbouring nodes of a current node is obtained in response to determining that a present level obtained by partitioning an input point cloud is lower than a target level.

In the embodiments of the application, an encoder or a decoder may execute S101 to S103 so as to obtain a first prediction result of performing intra prediction on occupation information of a child node of a current node.

Here, the encoder executes S101 to S103, for example. The encoder includes a 3D point cloud coder, such as a G-PCC encoder. The G-PCC encoder, after performing slice partition on an input point cloud, encodes each slice independently. Here, the encoder obtains occupation information of a first number of neighbouring nodes of the current node in response to determining that a present level obtained by partitioning the input point cloud is lower than a target level. In some embodiments, the encoder may partition the input point cloud based on octree.

In S102, the occupation information of a second number of neighbouring nodes is extracted from the occupation information of the first number of neighbouring nodes.

The first number is greater than the second number. The second number of neighbouring nodes are in an association relationship with a child node of the current node.

In the embodiments of the application, the encoder, after obtaining the occupation information of the first number of neighbouring nodes of the current node, extracts the occupation information of the second number of neighbouring nodes from the occupation information of the first number of neighbouring nodes.

It is to be noted that the second number of neighbouring nodes are in an association relationship with the child node of the current node. That is, after the occupation information of the first number of neighbouring nodes of the current node is obtained, the occupation information of the first number of neighbouring nodes of the current node is screened first to determine the occupation information of neighbouring nodes with certain influences on the child node of the current node, and the selected occupation information is taken as a reference factor for intra prediction of the occupation information of the child node of the current node. As such, calculations brought considering the occupation information of all of the first number of neighbouring nodes are reduced, and a foundation is laid for shortening the coding time and improving the coding efficiency and the coding accuracy.

In S103, intra prediction is performed on occupation information of the child node of the current node based on the occupation information of the second number of neighbouring nodes to obtain a first prediction result.

In the embodiments of the application, the encoder, after screening out the occupation information of the second number of neighbouring nodes, performs intra prediction on occupation information of the child node of the current node based on the occupation information of the second number of neighbouring nodes to obtain a first prediction result.

According to the method for intra prediction provided in the embodiments of the application, occupation information of a first number of neighbouring nodes of a current node is obtained in response to determining that a present level obtained by partitioning an input point cloud is lower than a target level.

The occupation information of a second number of neighbouring nodes is extracted from the occupation information of the first number of neighbouring nodes, the first number being greater than the second number, and the second number of neighbouring nodes being in an association relationship with a child node of the current node.

Intra prediction is performed on occupation information of the child node of the current node based on the occupation information of the second number of neighbouring nodes to obtain a first prediction result.

That is, in the embodiments of the application, when intra prediction is performed on the occupation information of the child node of the current node, only the second number of neighbouring nodes in an association relationship with the child node of the current node are considered. Therefore, the aims of reducing LUTs and the calculation complexity, improving the accuracy of an intra prediction result, shortening the encoding/decoding time, and improving the encoding/decoding accuracy are fulfilled.

Figure 3:
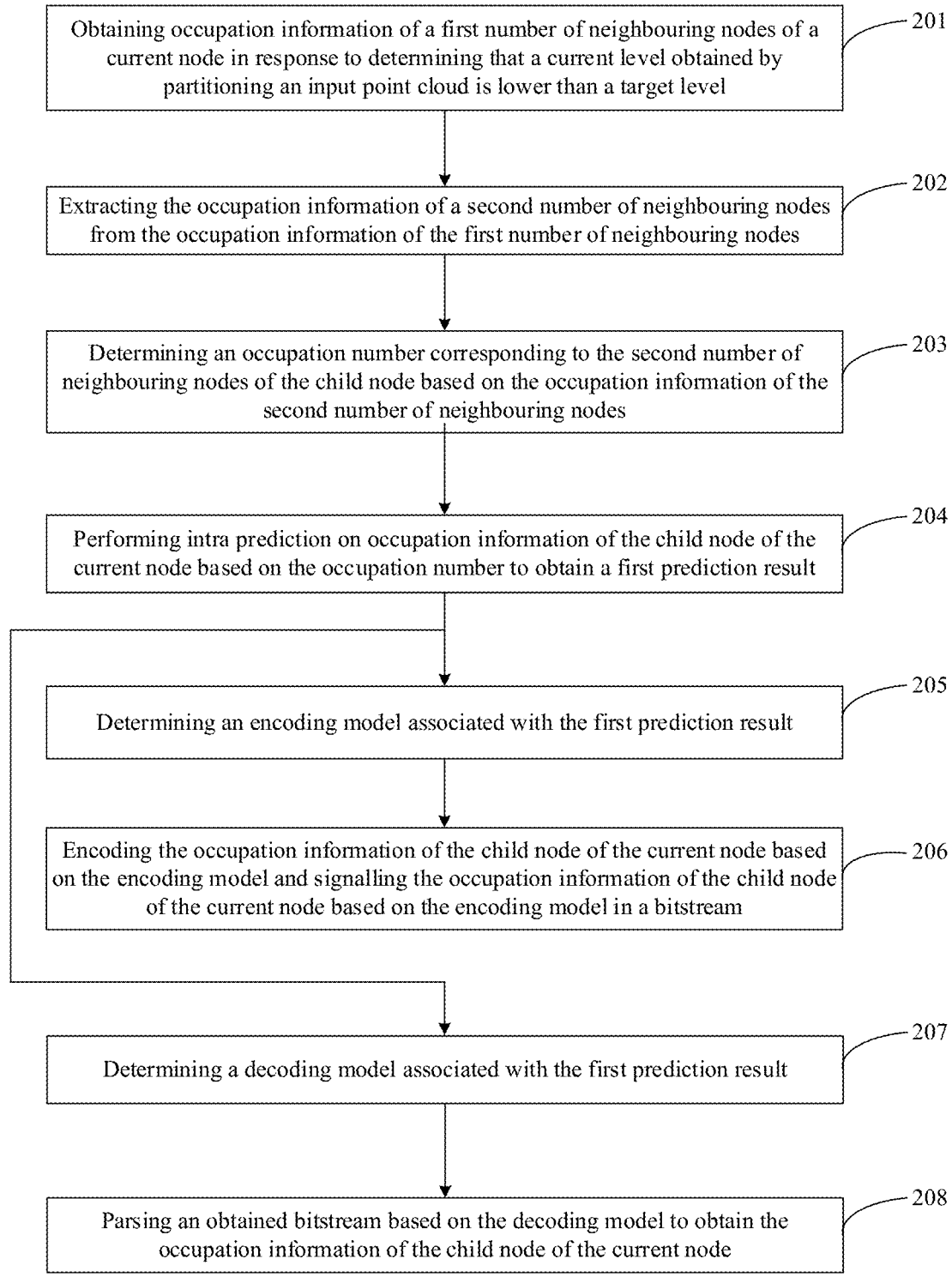
FIG. 3 is a second exemplary flowchart of a method for intra prediction according to embodiments of the application.

Embodiments of the application provide a method for intra prediction. Referring to FIG. 3, it is to be noted that, when the intra prediction method is applied to an encoder, the method includes S201 to S206. When the method for intra prediction is applied to a decoder, the method includes S201 to S204 and S207 to S208.

In some embodiments, the encoder includes a 3D point cloud encoder, and the decoder includes a 3D point cloud decoder.

In S201, occupation information of a first number of neighbouring nodes of a current node is obtained in response to determining that a present level obtained by partitioning an input point cloud is lower than a target level.

In the embodiments of the application, the encoder or the decoder obtains occupation information of a first number of neighbouring nodes of a current node in response to determining that a present level L obtained by partitioning an input point cloud is lower than a target level. Exemplarily, the encoder or the decoder obtains occupation information $\delta$ of the current node k according to the input point cloud, where k is valued to [0, 25], and $\delta$ is 0 or 1.

In S202, the occupation information of a second number of neighbouring nodes is extracted from the occupation information of the first number of neighbouring nodes.

The first number is greater than the second number. The second number of neighbouring nodes are in an association relationship with a child node of the current node. Here, the association relationship includes the second number of neighbouring nodes adjoin the child node of the current node by a face, edge and corner.

In the embodiments of the application, the second number of neighbouring nodes include neighbouring nodes adjoining the child node of the current node by a face, edge and corner. Therefore, neighbouring nodes hardly or slightly affecting a certain child node of the current node are screened out from the first number of neighbouring nodes. As such, calculations are reduced, meanwhile, the encoding/decoding time is shortened effectively, and the encoding/decoding accuracy is ensured.

In S203, an occupation number corresponding to the second number of neighbouring nodes of the current node is determined based on the occupation information of the second number of neighbouring nodes.

In the embodiments of the application, the encoder or the decoder determines an occupation number corresponding to the second number of neighbouring nodes of the current node based on the occupation information of the screened-out second number of neighbouring nodes to obtain $No_m$.

Exemplarily, for a child node m of the current node, occupation information of seven neighbours thereof is considered, and a LUT $l_{m,n}$ is set to map numbers n of the seven neighbours to numbers k of 26 neighbours. Then, the number of occupied neighbours in the seven neighbours of the child node m is recorded.

Herein, $No_m = \Sum_{n=0}^{6} \delta(l_{m,n})$.

In S204, intra prediction is performed on occupation information of the child node of the current node based on the occupation number to obtain a first prediction result.

The first prediction result is used for indicating whether to perform prediction and a prediction value in case of performing prediction.

In the embodiments of the application, the operation in S204 that intra prediction is performed on occupation information of the child node of the current node based on the occupation number to obtain a first prediction result may be implemented by the following operations.

In S204a, a third number associated with the second number is obtained.

In some embodiments, the third number may be equal to a half of the second number. Certainly, in other embodiments of the application, the third number may be determined flexibly based on the second number according to an actual situation.

Exemplarily, the third number may be 4 in case of considering seven neighbouring nodes of the child node m.

In S204b, intra prediction is performed on occupation information of the child node of the current node based on the occupation number and the third number to obtain the first prediction result.

In some embodiments of the application, the operation in S204b that intra prediction is performed on occupation information of the child node of the current node based on the occupation number and the third number to obtain the first prediction result includes the following operation.

In S204b1, in response to determining that the occupation number is different from the third number, intra prediction is performed on the occupation information of the child node of the current node based on the occupation number, a first threshold, and a second threshold to obtain the first prediction result.

In the embodiments of the application, in case of $No_m \neq 4$, two sets of thresholds are set, including a first threshold $th_0$ and second threshold $th_1$, and it is predicted that the node is "unoccupied" when $No_m$ is less than or equal to $th_0$ and is "occupied" when $No_m$ is greater than or equal to $th_1$. Otherwise, prediction is skipped. It is to be noted that "occupied" indicates that the child node of the current node includes a point cloud and "unoccupied" indicates that the child node of the current node does not include point cloud.

Further, when it is determined that the occupation number is different from the third number, in an implementable scenario, the operation in S204b1 that intra prediction is performed on the occupation information of the child node of the current node based on the occupation number, a first threshold, and a second threshold to obtain the first prediction result may include the following operations.

In S11, the occupation number is compared with the first threshold.

In S12, in response to determining that the occupation number is less than or equal to the first threshold, intra prediction is performed on the occupation information of the child node of the current node to obtain a first prediction result that the child node of the current node does not include point cloud.

Further, when it is determined that the occupation number is different from the third number, in another implementable scenario, the operation that intra prediction is performed on the occupation information of the child node of the current node based on the occupation number, a first threshold, and a second threshold to obtain the first prediction result may include the following operations.

In S21, the occupation number is compared with the second threshold.

In S22, in response to determining that the occupation number is greater than or equal to the second threshold, intra prediction is performed on the occupation information of the child node of the current node to obtain a first prediction result that the child node of the current node includes point cloud.

In another implementable scenario of the application, the occupation number is compared with the first threshold, and a second prediction result that intra prediction is skipped for the occupation information of the child node of the current node is obtained in response to determining that the occupation number is greater than the first threshold and less than the second threshold.

In other embodiments of the application, the operation in S204b that intra prediction is performed on occupation information of the child node of the current node based on the occupation number and the third number to obtain the first prediction result includes the following operation.

In S204b2, in response to determining that the occupation number is the same as the third number, intra prediction is performed on the occupation information of the child node of the current node based on the occupation number, a third threshold, and a fourth threshold to obtain the first prediction result.

In the embodiments of the application, the operation in S204b2 that in response to determining that the occupation number is the same as the third number, intra prediction is performed on the occupation information of the child node of the current node based on the occupation number, a third threshold, and a fourth threshold to obtain the first prediction result may include the following operations.

In S204b21, weights of the occupation information of the second number of neighbouring nodes are set according to distances between the second number of neighbouring nodes of the current node and the child node in response to determining that the occupation number is the same as the third number.

In S204b22, a target parameter of the child node is determined based on the occupation information of the second number of neighbouring nodes and the weights corresponding to the occupation information of the second number of neighbouring nodes.

In S204b23, the first prediction result is determined based on the target parameter, the third threshold, and the fourth threshold.

Further, in an implementable scenario, the operation in S204b23 that the first prediction result is determined based on the target parameter, the third threshold, and the fourth threshold may include the following operation. In response to determining that the target parameter is less than or equal to the third threshold, intra prediction is performed on the occupation information of the child node of the current node to obtain a first prediction result that the child node of the current node does not include point cloud.

In the embodiments of the application, in case of $No_m = 4$, weights $w(d_{m,n})$ are set according to distance levels $d_{m,n}$ between the seven neighbours of the current child node m and m, and a target parameter $score_m = \sum_{n=0}^{6} \delta(l_{m,n}) \times w(d_{m,n})$ is calculated.

Here, two sets of thresholds are set, i.e., a third threshold $th_2$ and a fourth threshold $th_3$. It is predicted that the node is "unoccupied" when $score_m$ is less than or equal to $th_2$ and is "occupied" when $score_m$ is greater than or equal to $th_3$. Otherwise, "skip prediction" is obtained.

Figure 4:
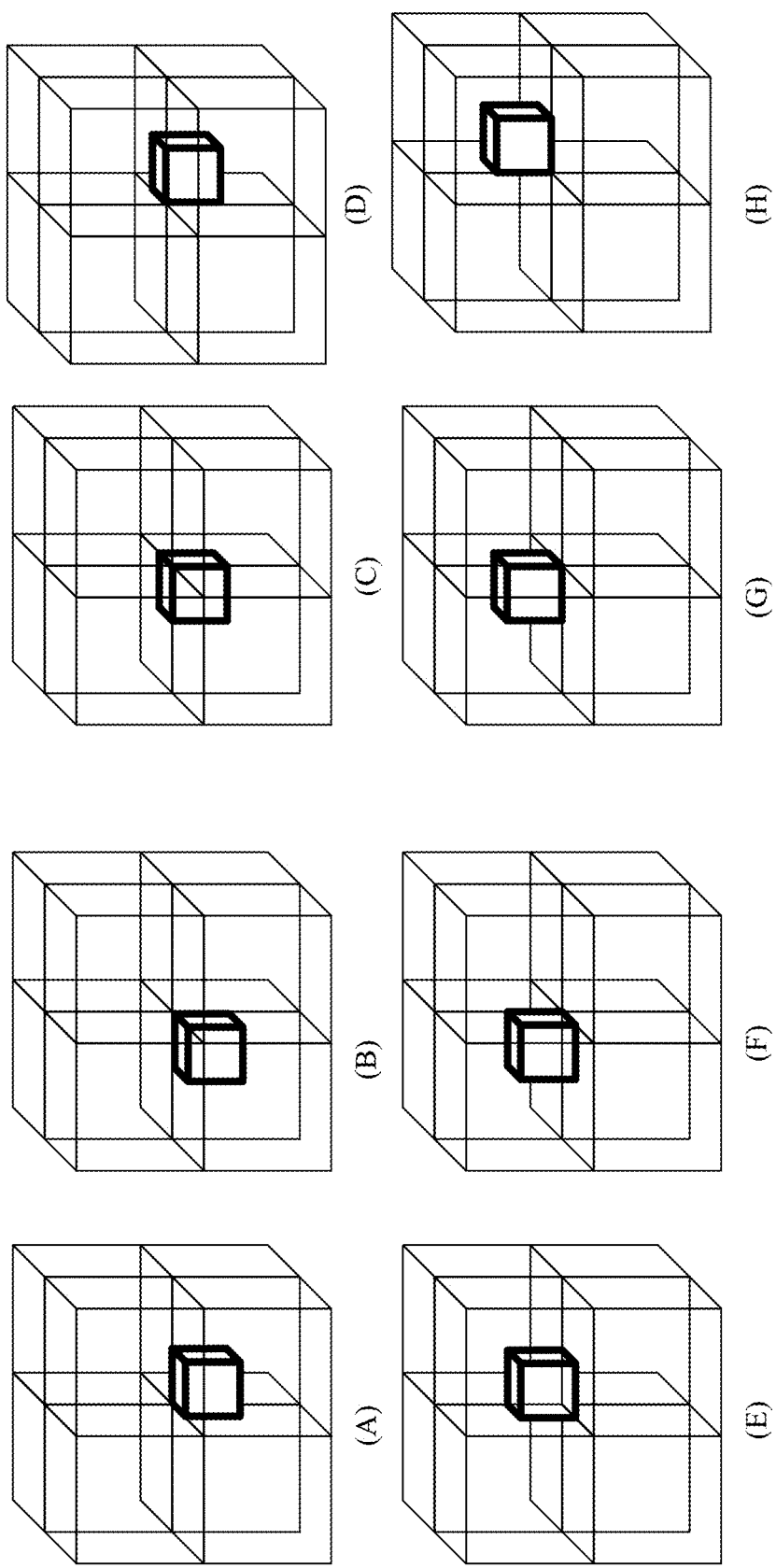
FIG. 4 is an exemplary schematic diagram that different child nodes of a current node include point clouds according to embodiments of the application.

Exemplarily, (A) to (H) in FIG. 4 represent occupation conditions corresponding to different child nodes of the current node respectively, i.e., occupation information of different child nodes of the current node.

Here, $l_{m,n}$ and $d_{m,n}$ are 8×7 LUTs. $w(d_{m,n})$, $th_0$, $th_1$, $th_2$, and $th_3$ are theoretical optimal values set according to the probability statistics and calculation of an encoding/decoding result of a training set, and they are preset fixed values in the encoder/decoder, and need not to be transmitted by the encoder to the decoder.

In the embodiments of the application, exemplarily,
LUT_l[8][7]={{0,1,3,4,9,10,12},{1,2,4,5,10,11,13},{3,4,6, 7,12,14,15},{4,5,7,8,13,15,16},{9,10, 12,17,18,20,21},{10, 11,13,18,19,21,22},{12,14,15,20,21,23,24},{13,15,16,21, 22,24,25}};
LUT_d[8][7]={{2,1,1,0,1,0,0},{1,2,0,1,0,1,0},{1,0,2,1,0,1, 0},{0,1,1,2,0,0,1},{1,0,0,2,1,1,0},{0,1,0,1,2,0,1},{0,1,0,1, 0,2,1},{0,0,1,0,1,1,2}}.

The setting of the weight $w(d_{m,n})$ needs to satisfy the condition that $score_m$ may be mapped to order-irrelevant combinations of $\delta(l_{m,n})$ and $w(d_{m,n})$ one to one. Taking w[3]={11,7,5} as an example, the thresholds are set as follows: $th_0=2$, $th_1=5$, $th_2=0$, and $th_3=40$.

Further, in another implementable scenario, the operation in S204b23 that the first prediction result is determined based on the target parameter, the third threshold, and the fourth threshold may include the following operation. In response to determining that the target parameter is more than or equal to the fourth threshold, intra prediction is performed on the occupation information of the child node of the current node to obtain a first prediction result that the child node of the current node includes a point cloud.

Further, in another implementable scenario, the operation in S204b23 that the first prediction result is determined based on the target parameter, the third threshold, and the fourth threshold may include the following operation.

A second prediction result that intra prediction is skipped for the occupation information of the child node of the current node is obtained in response to determining that the target parameter is greater than the third threshold and less than the fourth threshold.

In S205, an encoding model associated with the first prediction result is determined.

In the embodiments of the application, the encoder, after obtaining the first prediction result, determines an encoding model associated with the first prediction result.

In S206, the occupation information of the child node of the current node is encoded based on the encoding model and the occupation information of the child node of the current node based on the encoding model is signalled in a bitstream.

In the embodiments of the application, the encoder encodes the occupation information of the child node of the current node based on the encoding model and signals the occupation information of the child node of the current node based on the encoding model in a bitstream.

In S207, a decoding model associated with the first prediction result is determined.

In the embodiments of the application, the decoder, after obtaining the first prediction result, determines a decoding model associated with the first prediction result.

In S208, an obtained bitstream is parsed based on the decoding model to obtain the occupation information of the child node of the current node.

In the embodiments of the application, the decoder parses an obtained bitstream based on the decoding model to obtain the occupation information of the child node of the current node.

Figure 5:
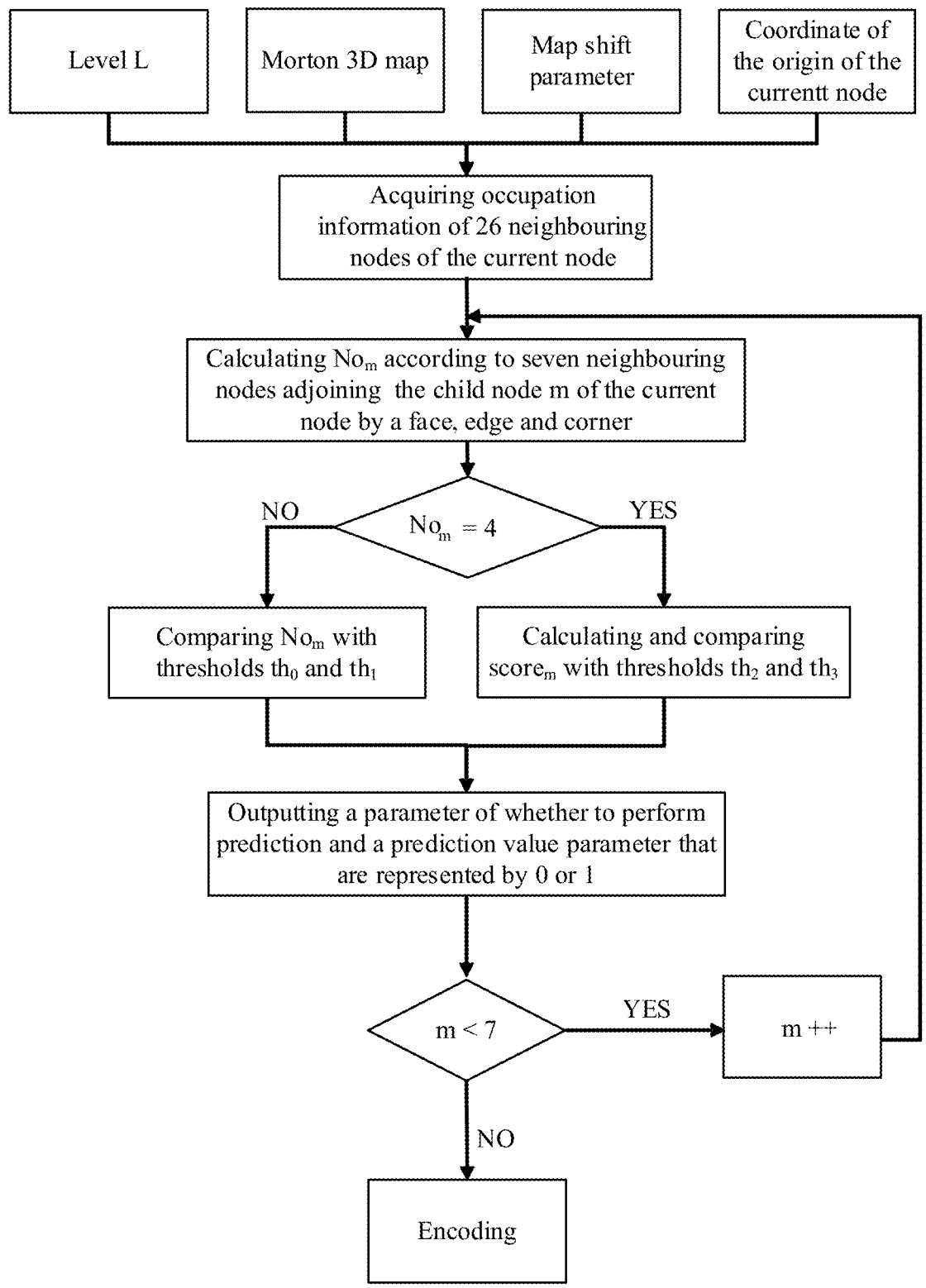
FIG. 5 is a first flowchart of a method for intra prediction executed by an encoder according to embodiments of the application.

In an implementable scenario, referring to FIG. 5, taking the method for intra prediction being applied to the encoder as an example, when predicting a certain child node of the current node, the encoder only considers influences of seven connected neighbour parent nodes adjoining the certain child node by a face, edge and corner. Then, three kinds of prediction results are obtained according to the calculation of weights and the setting of thresholds. The method for intra prediction executed by the encoder includes the following operations.

In step 1, intra prediction is enabled when a current level L of octree partition is lower than a preset level. An input is a Morton 3D map for mapping an (x, y, z) coordinate and a flag bit, a map shift parameter, and a coordinate of an origin of the current node.

In step 2, occupation information $\delta$ of a neighbouring node k is obtained according to the input information, where k is valued to [0, 25], and $\delta$ is 0 or 1.

In step 3, for a child node m of the current node, occupation information of seven neighbours thereof is considered only, and a LUT $l_{m,n}$ is set to map numbers n of the seven neighbours to numbers k of 26 neighbours. Then, the number of occupied neighbours in the seven neighbours of the child node m is recorded:

$$No_m = \sum_{n=0}^{6} \delta(l_{m,n})$$

In step 4, in case of $No_m \neq 4$, two sets of thresholds $th_0$ and $th_1$ are set, and it is predicted that the node is "unoccupied" when $No_m$ is less than or equal to $th_0$ and is "occupied" when $No_m$ is greater than or equal to $th_1$. Otherwise, "skip prediction" is obtained.

In case of $No_m=4$, weights $w(d_{m,n})$ are set according to distance levels $d_{m,n}$ between the seven neighbours of the current child node m and m, and $score_m$ is calculated:

$$score_m = \sum_{n=0}^{6} \delta(l_{m,n}) \times w(d_{m,n})$$

Two sets of thresholds $th_2$ and $th_3$ are set. It is predicted that the node is "unoccupied" when $score_m$ is less than or equal to $th_2$ and is "occupied" when $score_m$ is greater than or equal to $th_3$. Otherwise, "skip prediction" is obtained.

In step 5, "whether to perform prediction" and "prediction value" represented by 0 or 1 are output for subsequent entropy coding of occupation information. Here, 1, 1 represents "occupied", 1, 0 represents "unoccupied", and 0, 0 represents "skip prediction".

It is to be noted that, $l_{m,n}$ and $d_{m,n}$ are 8×7 LUTs. $w(d_{m,n})$, $th_0$, $th_1$, $th_2$, and $th_3$ are theoretical optimal values set according to the probability statistics and calculation of a encoding/decoding result of a training set, and they are preset fixed values in the encoder/decoder, and need not to be transmitted by the encoder to the decoder. That is, the technical concepts of the method for intra prediction provided in the application at the encoder side and the decoder side are the same. It can be understood that, except related operations for encoding at the encoder side and decoding at the decoder side, the operations for the intra prediction of the occupation information of the child node of the current node are the same.

Exemplarily, in some embodiments,
LUT_l[8][7]={{0,1,3,4,9,10,12},{1,2,4,5,10,11,13},{3,4,6, 7,12,14,15},{4,5,7,8,13,15,16},{9,10, 12,17,18,20,21},{10, 11,13,18,19,21,22},{12,14,15,20,21,23,24},{13,15,16,21, 22,24,25}};
LUT_d[8][7]={{2,1,1,0,1,0,0},{1,2,0,1,0,1,0},{1,0,2,1,0,1, 0},{0,1,1,2,0,0,1},{1,0,0,2,1,1,0},{0,1,0,1,2,0,1},{0,1,0,1, 0,2,1},{0,0,1,0,1,1,2}}.

The setting of the weight $w(d_{m,n})$ needs to satisfy the condition that $score_m$ may be mapped to order-irrelevant combinations of $\delta(l_{m,n})$ and $w(d_{m,n})$ one to one. Taking w[3]={11,7,5} as an example, the thresholds are set as follows: $th_0=2$, $th_1=5$, $th_2=0$, and $th_3=40$.

Further, the encoder determines an encoding model associated with the first prediction result, and encodes the occupation information of the child node of the current node based on the encoding model and signals the occupation information of the child node of the current node based on the encoding model in a bitstream.

Figure 6:
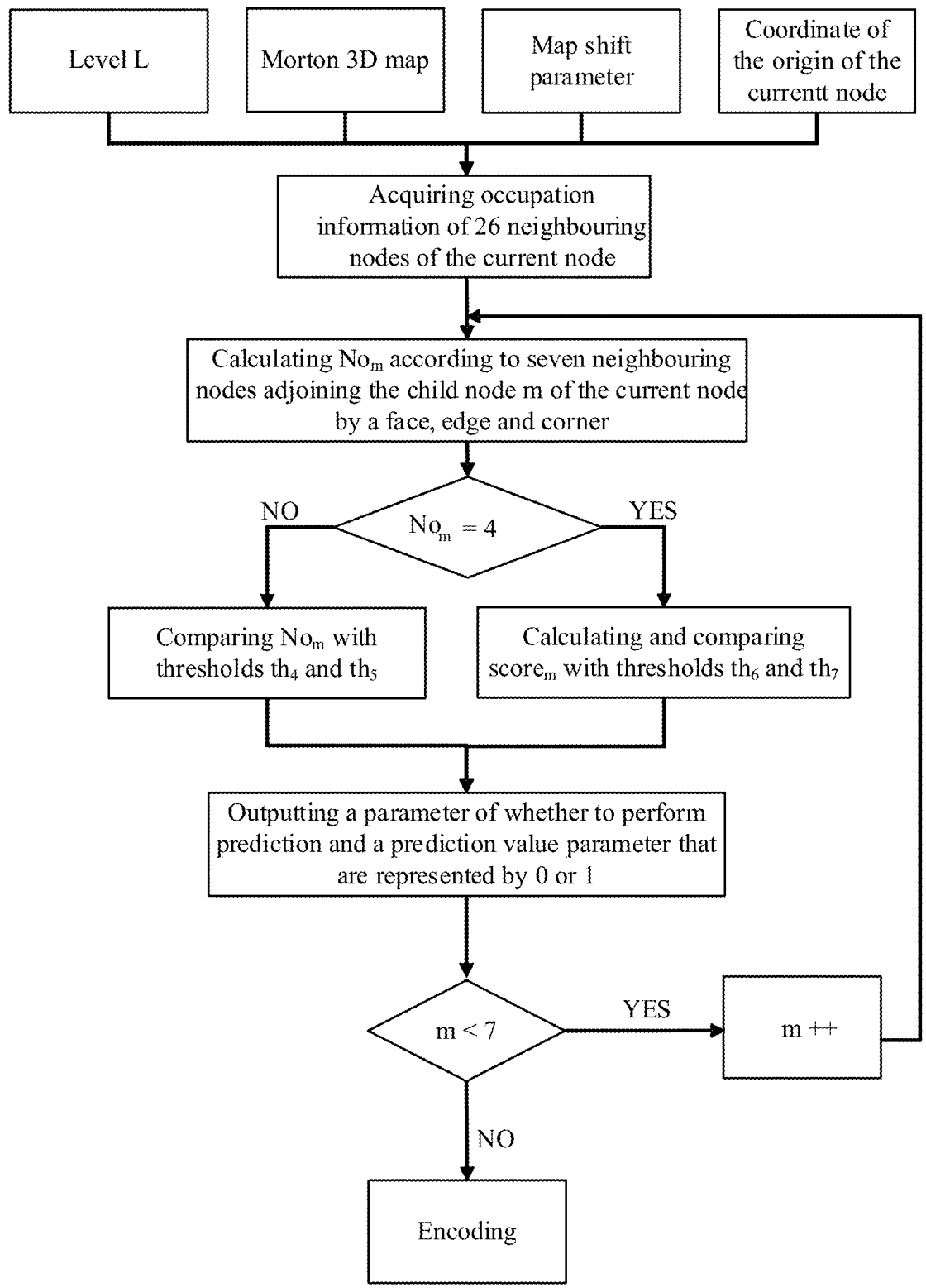
FIG. 6 is a first flowchart of a method for intra prediction executed by a decoder according to embodiments of the application.

In an implementable scenario, referring to FIG. 6, taking the method for intra prediction being applied to the decoder as an example, the decoder, when predicting a certain child node of the current node, only considers influences of seven connected neighbour parent nodes adjoining the child node by a face, edge and corner. Then, three kinds of prediction results are obtained according to the calculation of weights and the setting of thresholds. The method for intra prediction executed by the decoder includes the following operations.

In step 1, intra prediction is enabled when a current level L of octree partition is lower than a preset level. An input is a Morton 3D map for mapping an (x, y, z) coordinate and a flag bit, a map shift parameter, and a coordinate of an origin of the current node.

In step 2, occupation information δ of a neighbouring node k is obtained according to the input information, where k is valued to [0, 25], and δ is 0 or 1.

In step 3, for a child node m of the current node, occupation information of seven neighbours thereof is considered only, and a LUT $l_{m,n}$ is set to map numbers n of the seven neighbours to numbers k of 26 neighbours. Then, the number of occupied neighbours in the seven neighbours of the child node m is recorded:

$$No_m = \sum_{n=0}^{6} \delta(l_{m,n})$$

In step 4, in case of $No_m \neq 4$, two sets of thresholds $th_0$ and $th_1$ are set, and it is predicted that the node is "unoccupied" when $No_m$ is less than or equal to $th_0$ and is "occupied" when $No_m$ is greater than or equal to $th_1$. Otherwise, "skip prediction" is obtained.

In case of $No_m=4$, weights $w(d_{m,n})$ are set according to distance levels $d_{m,n}$ between the seven neighbours of the current child node m and m, and $score_m$ is calculated:

$$score_m = \sum_{n=0}^{6} \delta(l_{m,n}) \times w(d_{m,n})$$

Two sets of thresholds $th_2$ and $th_3$ are set. It is predicted that the node is "unoccupied" when $score_m$ is less than or equal to $th_2$ and is "occupied" when $score_m$ is greater than or equal to $th_3$. Otherwise, "skip prediction" is obtained.

In step 5, "whether to perform prediction" and "prediction value" represented by 0 or 1 are output for subsequent entropy coding of occupation information. Here, 1, 1 represents "occupied", 1, 0 represents "unoccupied", and 0, 0 represents "skip prediction".

Further, the decoder determines a decoding model associated with the first prediction result, and parses an obtained bitstream based on the decoding model to obtain occupation information of the child node of the current node.

It is to be noted that, $l_{m,n}$ and $d_{m,n}$ are 8×7 LUTs. $w(d_{m,n})$, $th_0$, $th_1$, $th_2$, and $th_3$ are theoretical optimal values set according to the probability statistics and calculation of an encoding/decoding result of a training set, and they are preset fixed values in the coder/decoder, and need not to be transmitted by the coder to the decoder. That is, the technical concepts of the intra prediction method provided in the application at the coder side and the decoder side are the same. It can be understood that, except related operations for coding at the coder side and decoding at the decoder side, the operations for the intra prediction of the occupation information of the child node of the current node are the same.

Exemplarily, in some embodiments,
LUT_l[8][7]={{0,1,3,4,9,10,12},{1,2,4,5,10,11,13},{3,4,6, 7,12,14,15},{4,5,7,8,13,15,16},{9,10, 12,17,18,20,21},{10, 11,13,18,19,21,22},{12,14,15,20,21,23,24},{13,15,16,21, 22,24,25}};
LUT_d[8][7]={{2,1,1,0,1,0,0},{1,2,0,1,0,1,0},{1,0,2,1,0,1, 0},{0,1,1,2,0,0,1},{1,0,0,2,1,1,0},{0,1,0,1,2,0,1},{0,1,0,1, 0,2,1},{0,0,1,0,1,1,2}}.

The setting of the weight $w(d_{m,n})$ needs to satisfy the condition that $score_m$ may be mapped to order-irrelevant combinations of $\delta(l_{m,n})$ and $w(d_{m,n})$ one to one. Taking w[3]={11,7,5} as an example, the thresholds are set as follows: $th_0=2$, $th_1=5$, $th_2=0$, and $th_3=40$.

In another implementable scenario, taking the method for intra prediction being applied to the encoder as an example, the above-mentioned intra prediction solution may further be simplified, thereby further reducing calculations for intra prediction. The method for intra prediction executed by the encoder includes the following operations.

In this scenario, the calculation of $score_m$ and judgment in case of $No_m=4$ may be omitted, and meanwhile, the setting of the distance level $d_{m,n}$ and the weight $w(d_{m,n})$ may also be omitted. Therefore, the method for intra prediction includes the following operations.

In step 1, intra prediction is enabled when a current level L of octree partition is lower than a preset level. An input is a Morton 3D map for mapping an (x, y, z) coordinate and a flag bit, a map shift parameter, and a coordinate of an origin of the current node.

In step 2, occupation information δ of a neighbouring node k is obtained according to the input information, where k is valued to [0, 25], and δ is 0 or 1.

In step 3, for a child node m of the current node, occupation information of seven neighbours thereof is considered only, and a LUT $l_{m,n}$ is set to map numbers n of the seven neighbours to numbers k of 26 neighbours. Then, the number of occupied neighbours in the seven neighbours of the child node m is recorded:

$$No_m = \sum_{n=0}^{6} \delta(l_{m,n})$$

In step 4, two sets of thresholds $th_0$ and $th_1$ are set. It is predicted that the node is "unoccupied" when $No_m$ is less than or equal to $th_0$ and is "occupied" when $No_m$ is greater than or equal to $th_1$. Otherwise, "skip prediction" is obtained.

In step 5, "whether to perform prediction" and "prediction value" represented by 0 or 1 are output for subsequent entropy coding of occupation information. Here, 1, 1 represents "occupied", 1, 0 represents "unoccupied", and 0, 0 represents "skip prediction".

It is to be noted that, $l_{m,n}$ is an 8×7 LUT. $th_0$ and $th_1$ are theoretical optimal values set according to the probability statistics and calculation of an encoding/decoding result of a training set, and they are preset fixed values in the encoder/decoder, and need not to be transmitted by the encoder to the decoder. That is, the technical concepts of the method for intra prediction provided in the application at the encoder side and the decoder side are the same. It can be understood that, except related operations for encoding at the encoder side and decoding at the decoder side, the operations for the intra prediction of the occupation information of the child node of the current node are the same.

Figure 7:
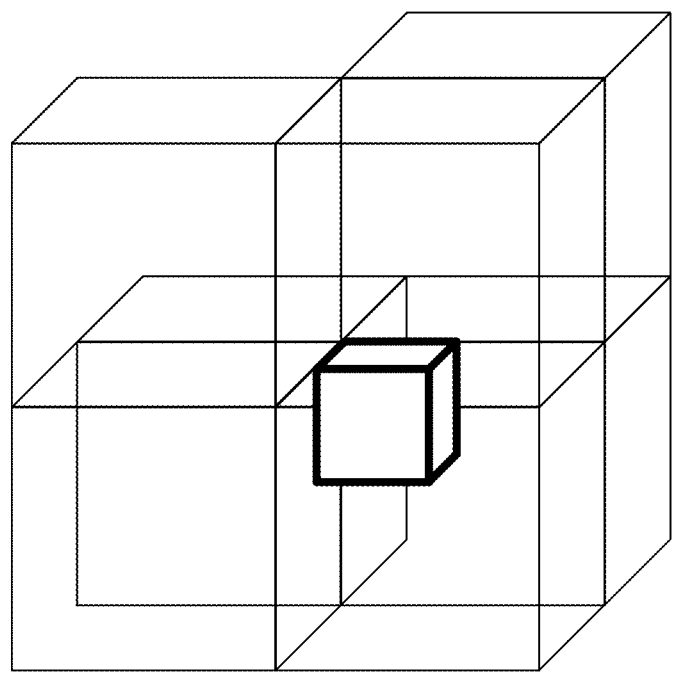
FIG. 7 is a schematic diagram that a certain child node of a current node includes a point cloud according to embodiments of the application.

In another implementable scenario, taking the method for intra prediction being applied to the encoder as an example, any possible combination is selected from the seven neighbour parent nodes connected with the current child node to construct a method for intra prediction based on occupation information of N neighbour parent nodes connected with a current child node, where $N \in [1,7]$. Exemplarily, referring to FIG. 7, there are $C_7^6$ combinations in case of N=6. FIG. 7 is a schematic diagram of intra prediction based on occupation information of six neighbour parent nodes. In this scenario, the method for intra prediction executed by the encoder includes the following operations.

In step 1, intra prediction is enabled when a current level L of octree partition is lower than a preset level. An input is a Morton 3D map for mapping an (x, y, z) coordinate and a flag bit, a map shift parameter, and a coordinate of an origin of the current node.

In step 2, occupation information δ of a neighbouring node k is obtained according to the input information, where k is valued to [0, 25], and δ is 0 or 1.

In step 3, for a child node m of the current node, occupation information of N neighbours thereof is considered only, and a LUT $l_{m,n}$ is set to map numbers n of the N neighbours to numbers k of 26 neighbours. Then, the number of occupied neighbours in the N neighbours of the child node m is recorded:

$$No_m = \sum_{n=0}^{N} \delta(l_{m,n})$$

In step 4, two sets of thresholds $th_0$ and $th_1$ are set. It is predicted that the node is "unoccupied" when $No_m$ is less than or equal to $th_0$ and is "occupied" when $No_m$ is greater than or equal to $th_1$. Otherwise, "skip prediction" is obtained.

In step 5, "whether to perform prediction" and "prediction value" represented by 0 or 1 are output for subsequent entropy coding of occupation information. Here, 1, 1 represents "occupied", 1, 0 represents "unoccupied", and 0, 0 represents "skip prediction".

It is to be noted that, $l_{m,n}$ is an 8×7 LUT. $th_0$ and $th_1$ are theoretical optimal values set according to the probability statistics and calculation of an encoding/decoding result of a training set, and they are preset fixed values in the encoder/decoder, and need not to be transmitted by the encoder to the decoder. That is, the technical concepts of the method for intra prediction provided in the application at the encoder side and the decoder side are the same. It can be understood that, except related operations for encoding at the encoder side and decoding at the decoder side, the operations for the intra prediction of the occupation information of the child node of the current node are the same.

Figure 8:
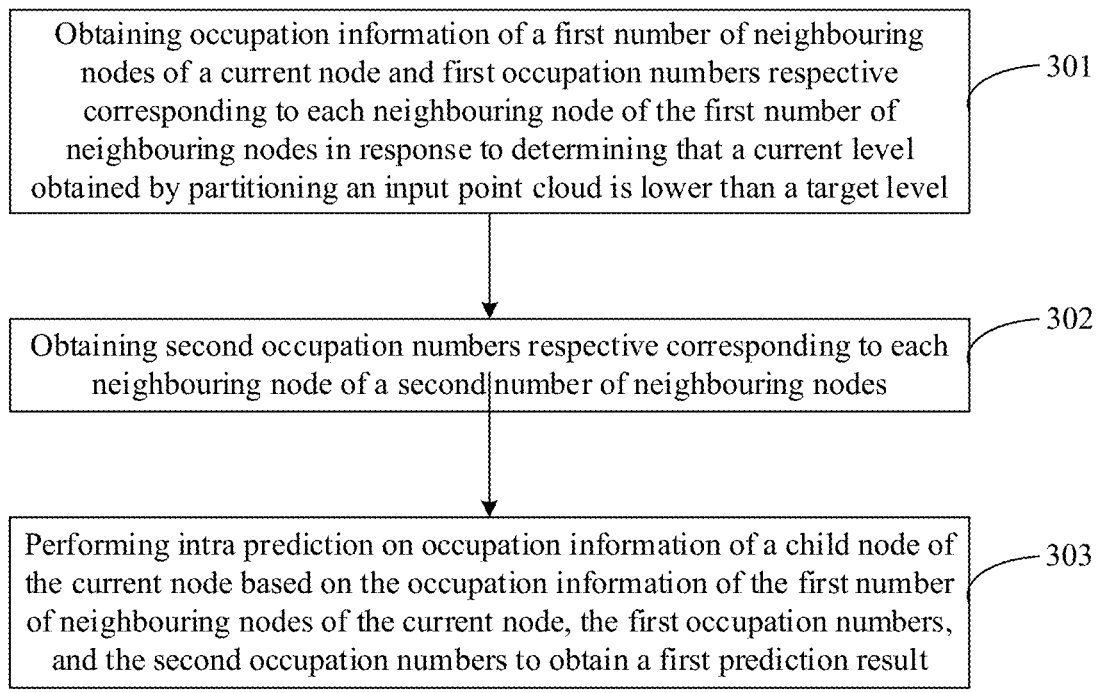
FIG. 8 is a third exemplary flowchart of a method for intra prediction according to embodiments of the application.

Embodiments of the application provide a method for intra prediction. Referring to FIG. 8, the method includes the following operations.

In S301, occupation information of a first number of neighbouring nodes of a current node and first occupation numbers respective corresponding to each neighbouring node of the first number of neighbouring nodes are obtained in response to determining that a current level obtained by partitioning an input point cloud is lower than a target level.

In the embodiments of the application, an encoder or a decoder may execute S301 to S303 so as to obtain a first prediction result of performing intra prediction on occupation information of a child node of a current node.

The occupation information refers to information indicating that the node is occupied or unoccupied.

The occupation number refers to the number of neighbouring nodes whose occupation information is information indicating that the node is occupied. It is to be noted that, at theen coder side, the input point cloud refers to encoded point cloud data, and at the decoder side, the input point cloud refers to decoded point cloud data.

Here, taking the coder executing S301 to S303 as an example, the encoder includes a 3D point cloud coder, such as a G-PCC coder. The G-PCC encoder, after performing slice partition on an input point cloud, encodes each slice independently. Here, the encoder obtains occupation information of a first number of neighbouring nodes of the current node and first occupation numbers respective corresponding to each neighbouring node of the first number of neighbouring nodes in response to determining that a current level obtained by partitioning the input point cloud is lower than a target level. In some embodiments, the encoder may partition the input point cloud based on octree.

In S302, second occupation numbers respective corresponding to each neighbouring node of a second number of neighbouring nodes is obtained.

The first number is greater than the second number. The second number of neighbouring nodes are in an association relationship with a child node of the current node.

In the embodiments of the application, the encoder selects a second number of neighbouring nodes from the first number of neighbouring nodes, and records second occupation numbers respective corresponding to each neighbouring node of the second number of neighbouring nodes.

In S303, intra prediction is performed on occupation information of a child node of the current node based on the occupation information of the first number of neighbouring nodes of the current node, the first occupation numbers, and the second occupation numbers to obtain a first prediction result.

In the embodiment of the application, the encoder performs intra prediction on occupation information of a child node of the current node based on the occupation information of the first number of neighbouring nodes of the current node, the first occupation numbers, and the second occupation numbers to obtain a first prediction result.

According to the method for intra prediction provided in the embodiments of the application, occupation information of a first number of neighbouring nodes of a current node and first occupation numbers respective corresponding to each neighbouring node of the first number of neighbouring nodes are obtained in response to determining that a current level obtained by partitioning an input point cloud is lower than a target level.

Second occupation numbers respective corresponding to each neighbouring node in a second number of neighbouring nodes is obtained, the first number being greater than the second number, and the second number of neighbouring nodes being in an association relationship with a child node of the current node. Intra prediction is performed on occupation information of the child node of the current node based on the occupation information of the first number of neighbouring nodes of the current node, the first occupation numbers, and the second occupation numbers to obtain a first prediction result. That is, in the embodiments of the application, according to occupation information of child nodes of encoded/decoded nodes in the first number of neighbouring nodes, when a certain child node of the current node is predicted, only influences of multiple, e.g., seven, connected neighbour parent nodes in an association relationship with the child node, for example, adjoining the child node by a face, edge and corner, are considered. Therefore, the effects of reducing LUTs and the calculation complexity are achieved, the coding time is shortened, and the coding efficiency and the coding accuracy are improved.

Figure 9:
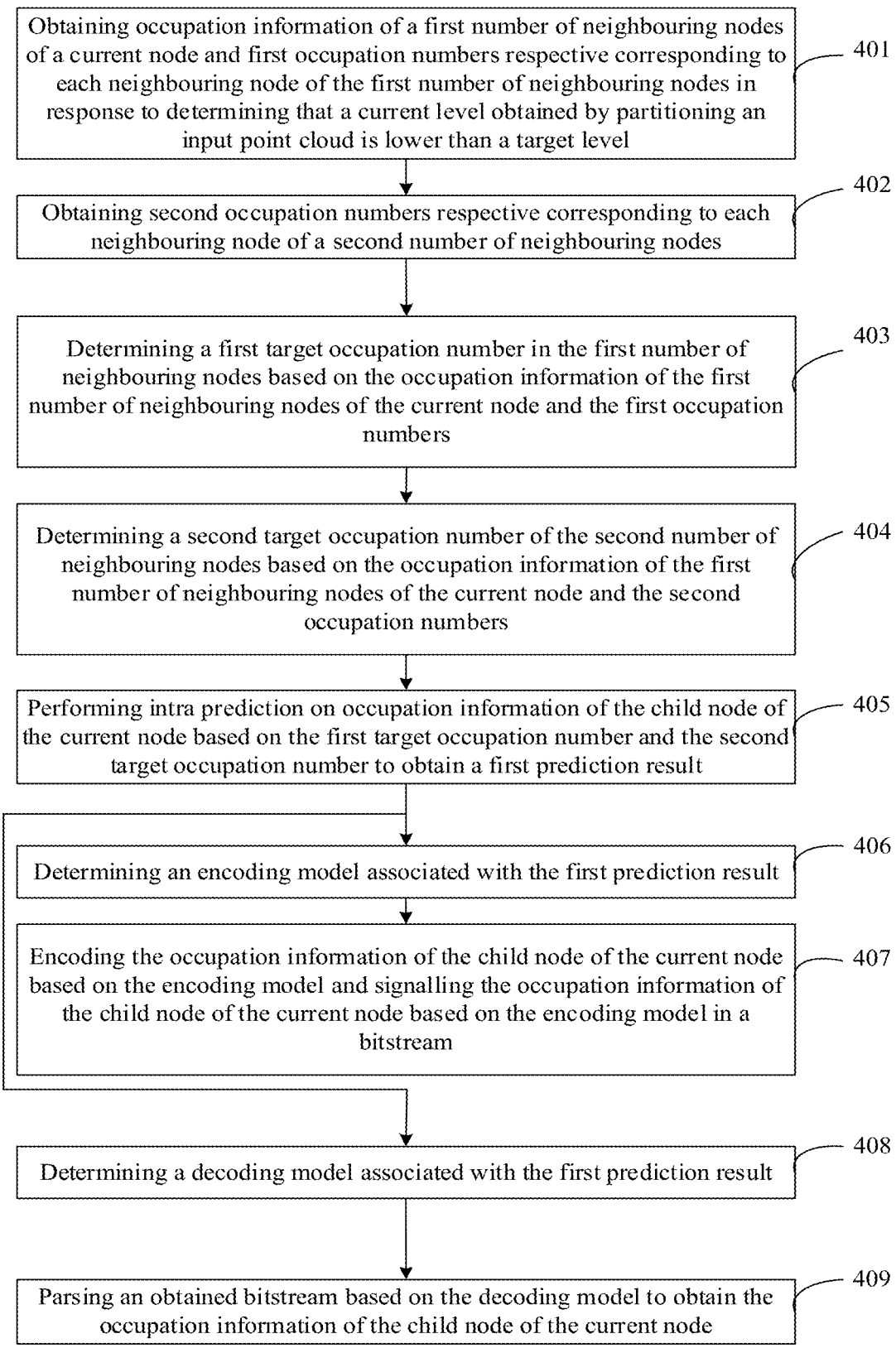
FIG. 9 is a fourth exemplary flowchart of a method for intra prediction according to embodiments of the application.

Embodiments of the application provide a method for intra prediction. Referring to FIG. 9, it is to be noted that, when the method for intra prediction is applied to an encoder, the method includes S401 to S407. When the method for intra prediction is applied to a decoder, the method includes S401 to S405 and S408 to S409.

In some embodiments, the encoder includes a 3D point cloud encoder, and the decoder includes a 3D point cloud decoder.

In S401, occupation information of a first number of neighbouring nodes of a current node and first occupation numbers respective corresponding to each neighbouring node of the first number of neighbouring nodes are obtained in response to determining that a current level obtained by partitioning an input point cloud is lower than a target level.

In S402, second occupation numbers respective corresponding to each neighbouring node of a second number of neighbouring nodes is obtained.

The first number is greater than the second number. The second number of neighbouring nodes are in an association relationship with a child node of the current node. The second number of neighbouring nodes adjoin the child node of the current node by a face, edge and corner.

In S403, a first target occupation number in the first number of neighbouring nodes is determined based on the occupation information of the first number of neighbouring nodes of the current node and the first occupation numbers.

Here, the encoder or the decoder obtains, for a kth neighbouring node of the first number of neighbouring nodes, occupation information of the kth neighbouring node and a first occupation number corresponding to the kth neighbouring node. Exemplarily, k is valued to [0, 25], and the encoder or the decoder cyclically executes operations from serial numbers 0 to 25 to obtain a total occupation number, i.e., a first target occupation number, of 26 neighbouring nodes.

In S404, a second target occupation number of the second number of neighbouring nodes is determined based on the occupation information of the first number of neighbouring nodes of the current node and the second occupation numbers.

Here, the encoder or the decoder finds a child node m adjoining the kth neighbouring node in the current node by a face, edge and corner from the first number of neighbouring nodes. Exemplarily, m is valued to [0, 7], and the encoder or the decoder cyclically executes operations from serial numbers 0 to 7 to obtain a total occupation number, i.e., a second target occupation number, of the 7 neighbouring nodes.

In S405, intra prediction is performed on occupation information of the child node of the current node based on the first target occupation number and the second target occupation number to obtain a first prediction result.

In the embodiments of the application, the operation in S405 that intra prediction is performed on occupation information of the child node of the current node based on the first target occupation number and the second target occupation number to obtain a first prediction result includes the following operations.

In S405a, a fourth number associated with the first number is obtained.

Here, the fourth number is determined by the first number. For example, the fourth number is a half of the first number. Exemplarily, the first number is 26, and the fourth number is 13.

In S405b, a magnitude relationship between the fourth number and the first target occupation number is obtained.

In S405c, intra prediction is performed on the occupation information of the child node of the current node based on the magnitude relationship and the second target occupation number to obtain the first prediction result.

In some embodiments of the application, the operation in S405c that intra prediction is performed on the occupation information of the child node of the current node based on the magnitude relationship and the second target occupation number to obtain the first prediction result includes the following operations.

In S405c11, a first target threshold and a second target threshold are generated in case that the magnitude relationship represents that the first target occupation number is greater than the fourth number.

The first target threshold is less than the second target threshold.

In S405c12, in response to determining that the second target occupation number is less than or equal to the first target threshold, intra prediction is performed on the occupation information of the child node of the current node to obtain a first prediction result that the child node of the current node does not include point cloud.

In S405c13, in response to determining that the second target occupation number is greater than or equal to the second target threshold, intra prediction is performed on the occupation information of the child node of the current node to obtain a first prediction result that the child node of the current node includes point cloud.

In S405c14, a second prediction result that a presence of the occupation information of the child node of the current node is unpredictable is obtained in response to determining that the second target occupation number is greater than the first target threshold and less than the second target threshold.

In some other embodiments of the application, the operation in S405c that intra prediction is performed on the occupation information of the child node of the current node based on the magnitude relationship and the second target occupation number to obtain the first prediction result includes the following operations.

In S405c21, a third target threshold and a fourth target threshold are generated in case that the magnitude relationship represents that the first target occupation number is less than or equal to the fourth number.

The third target threshold is less than the fourth target threshold. The third target threshold is equal to the second target threshold. The fourth target threshold being less than the second target threshold.

In some embodiments, the fourth number correspondingly changes along with the change of the first number. Exemplarily, when the first number is less than 26, the third target threshold may be different from the second target threshold, and the fourth target threshold may be different from the second target threshold.

In S405c22, in response to determining that the second target occupation number is less than or equal to the third target threshold, intra prediction is performed on the occupation information of the child node of the current node to obtain a first prediction result that the child node of the current node does not include point cloud.

In S405c23, in response to determining that the second target occupation number is greater than or equal to the fourth target threshold, intra prediction is performed on the occupation information of the child node of the current node to obtain a first prediction result that the child node of the current node includes point cloud.

In S405c24, a second prediction result that intra prediction is skipped for the occupation information of the child node of the current node is obtained in response to determining that the second target occupation number is greater than the third target threshold and less than the fourth target threshold.

In S406, an encoding model associated with the first prediction result is determined.

In the embodiments of the application, the encoder, after obtaining the first prediction result, determines an encoding model associated with the first prediction result.

In S407, the occupation information of the child node of the current node is encoded based on the encoding model and the occupation information of the child node of the current node based on the encoding model is signalled in a bitstream.

In the embodiments of the application, the encoder encodes the occupation information of the child node of the current node based on the encoding model and signals the occupation information of the child node of the current node based on the encoding model in a bitstream.

In S408, a decoding model associated with the first prediction result is determined.

In the embodiments of the application, the decoder, after obtaining the first prediction result, determines a decoding model associated with the first prediction result.

In S409, the obtained bitstream is parsed based on the decoding model to obtain the occupation information of the child node of the current node.

In the embodiments of the application, the decoder parses the obtained bitstream based on the decoding model to obtain the occupation information of the child node of the current node.

Figure 10:
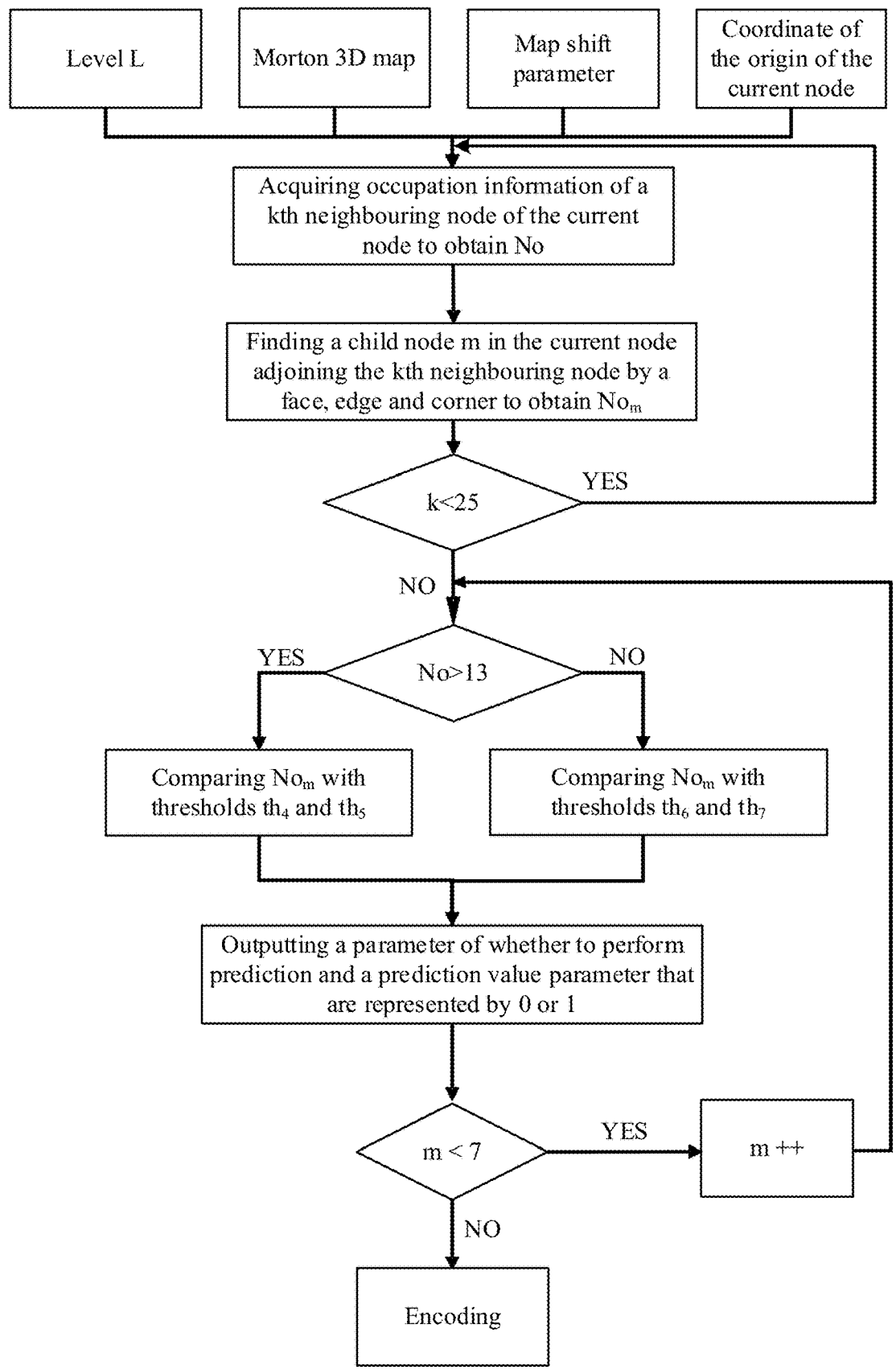
FIG. 10 is a second flowchart of a method for intra prediction executed by an encoder according to embodiments of the application.

In an implementable scenario, referring to FIG. 10, taking the method for intra prediction being applied to the encoder as an example, the encoder, when predicting a certain child node of the current node, only considers influences of seven connected neighbour parent nodes adjoining the child node by a face, edge and corner. The intra prediction method executed by the encoder includes the following operations.

In step 1, intra prediction is enabled when a current level L obtained by octree partition is lower than a preset level. An input is a Morton 3D map for mapping an (x, y, z) coordinate and a flag bit, a map shift parameter, and a coordinate of an origin of the current node.

In step 2, occupation information $\delta$ of a kth neighbouring node k of a current node is obtained according to input information, where k is valued to [0, 25], and $\delta$ is 0 or 1. Operations are cyclically executed based on that k is valued to 0 to 25 to obtain a first target occupation number No of 26 neighbouring nodes. A first occupation number corresponding to each neighbouring node of the first number of neighbouring nodes is equal to $No_{initial}+\delta$, where $No_{initial}$ is usually 0, and $\delta$ is 0 or 1. That is, an updated first occupation number corresponding to each neighbouring node is 1 or 0.

In step 3, a child node m adjoining the kth neighbouring node in the current node by a face, edge and corner is found, and a second target occupation number $No_m$ of seven neighbouring nodes is obtained.

Here, a second occupation number corresponding to each neighbouring node of a second number of neighbouring nodes is equal to $No_{initial}+\delta$, $m=l_{k,n}-1$. Further, the encoder or a decoder cyclically executes operations from serial numbers 0 to 7 to obtain a total occupation number, i.e., the second target occupation number, of the 7 neighbouring nodes.

In step 4, all of the 26 neighbouring nodes are cyclically traversed to obtain No and $No_m$.

In step 5, when No is greater than 13, two sets of thresholds $th_4$ and $th_5$ are set, and $No_m$ is compared with $th_4$ and $th_5$.

In step 6, when No is less than or equal to 13, two sets of thresholds $th_6$ and $th_7$ are set, and $No_m$ is compared with $th_6$ and $th_7$.

In step 7, in response to determining that $No_m$ is less than or equal to $th_4/th_6$, it is determined that the child node of the current node does not include any point cloud, namely the child node of the current node is "unoccupied". When $No_m$ is greater than or equal to $th_5/th_7$, it is determined that the child node of the current node includes a point cloud, namely the child node of the current node is "occupied". Otherwise, it is determined that intra prediction is skipped for occupation information of the child node of the current node.

In step 8, "whether to perform prediction" and "prediction value" represented by 0 or 1 are output for subsequent entropy coding of occupation information. 1, 1 represents that "the child node of the current node includes point cloud". 1, 0 represents that "the child node of the current node does not include point cloud". 0, 0 represents that "intra prediction is skipped for the occupation information of the child node of the current node".

In the embodiments of the application, exemplarily, LUT_I[26][4]={{1, 0, 0, 0}, {1, 2, 0, 0}, {2, 0, 0, 0}, {1, 3, 0, 0}, {1, 2, 3, 4}, {2, 4, 0, 0}, {3, 0,0,0}, {3,4,0,0}, {4,0,0,0}, {1, 5,0,0}, {1,2, 5, 6}, {2, 6,0,0}, {1,3, 5,7}, {2,4,6, 8}, {3,7,0,0}, {3,4,7, 8}, {4, 8,0,0}, {5,0,0,0}, {5, 6,0,0}, {6,0,0,0}, {5,7,0,0}, {5, 6,7, 8}, {6, 8, 0, 0}, {7, 0, 0, 0}, {7, 8, 0, 0}, {8, 0, 0, 0}}.

Here, $th_4=2$, $th_5=5$, $th_6=2$, and $th_7=4$.

Figure 11:
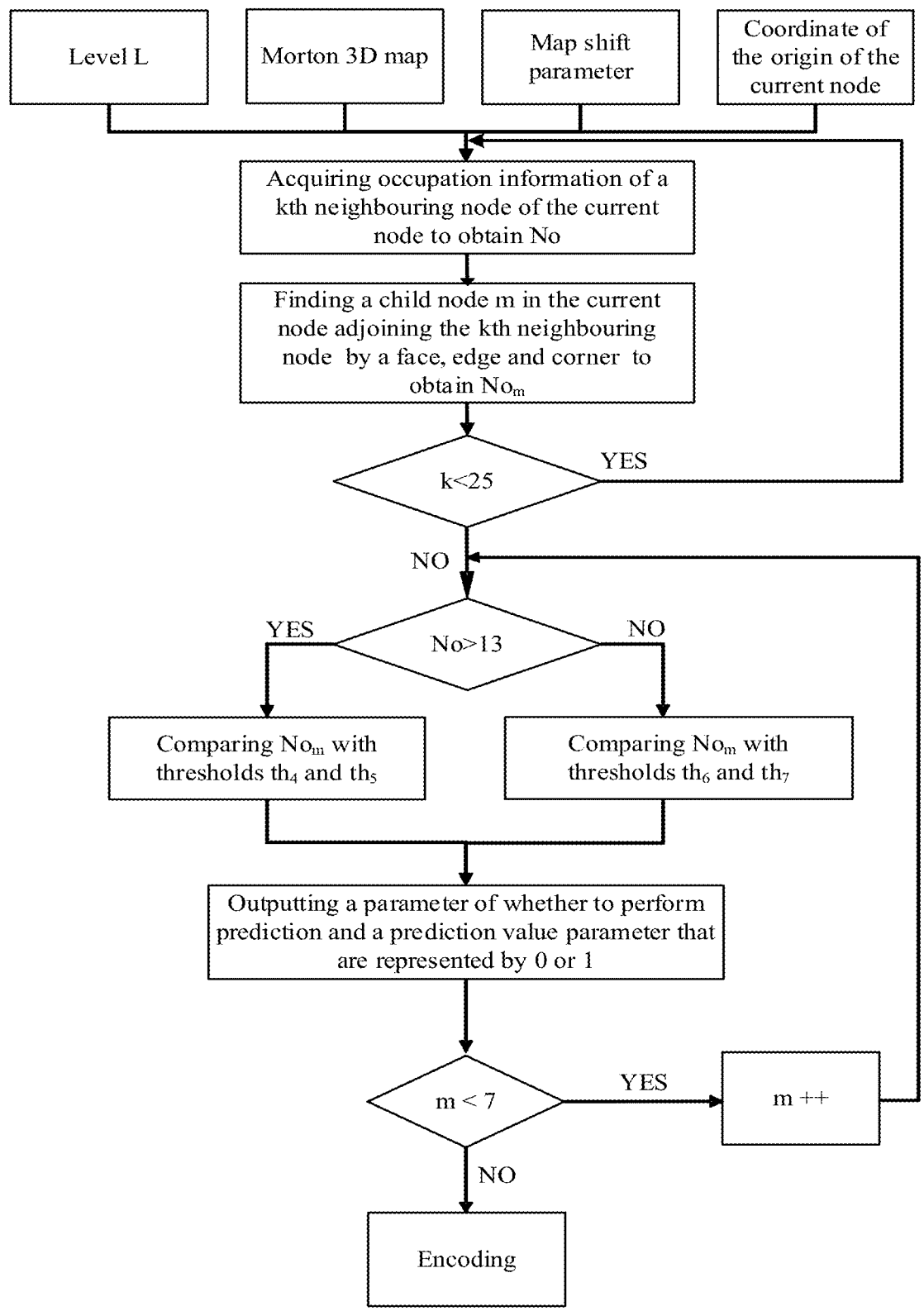
FIG. 11 is a second flowchart of a method for intra prediction executed by a decoder according to embodiments of the application.

Further, the encoder determines an encoding model associated with the first prediction result, and encodes occupation information of the child node of the current node based on the encoding model and signals the occupation information of the child node of the current node based on the encoding model in a bitstream, In an implementable scenario, referring to FIG. 11, taking the method for intra prediction being applied to the decoder as an example, the decoder, when predicting a certain child node of the current node, only considers influences of seven connected neighbour parent nodes adjoining the child node by a face, edge and corner. The method for intra prediction executed by the encoder includes the following operations.

In step 1, intra prediction is enabled when a current level L of octree partition is lower than a preset level. An input is a Morton 3D map for mapping an (x, y, z) coordinate and a flag bit, a map shift parameter, and a coordinate of an origin of the current node.

In step 2, occupation information δ of a kth neighbouring node k of a current node is obtained according to input information, where k is valued to [0, 25], and δ is 0 or 1. A first target occupation number No of 26 neighbouring nodes is obtained.

In step 3, a child node m adjoining the kth neighbouring node in the current node by a face, edge and corner is found, and a second target occupation number $No_m$ of seven neighbouring nodes is obtained.

In step 4, all of the 26 neighbouring nodes are cyclically traversed to obtain No and $No_m$.

In step 5, when No is larger than 13, two sets of thresholds $th_4$ and $th_5$ are set, and $No_m$ is compared with $th_4$ and $th_5$.

In step 6, when No is less than or equal to 13, two sets of thresholds $th_6$ and $th_7$ are set, and $No_m$ is compared with $th_6$ and $th_7$.

In step 7, in response to determining that $No_m$ is less than or equal to $th_4/th_6$, it is determined that the child node of the current node does not include any point cloud, namely the child node of the current node is "unoccupied". When $No_m$ is greater than or equal to $th_5/th_7$, it is determined that the child node of the current node includes a point cloud, namely the child node of the current node is "occupied". Otherwise, it is determined that intra prediction is skipped for occupation information of the child node of the current node.

In step 8, "whether to perform prediction" and "prediction value" represented by 0 or 1 are output for subsequent entropy coding of occupation information. 1, 1 represents that "the child node of the current node includes a point cloud". 1, 0 represents that "the child node of the current node does not include any point cloud". 0, 0 represents that "intra prediction is skipped for the occupation information of the child node of the current node".

In the embodiments of the application, exemplarily,

LUT_I[26][4]={{1, 0, 0, 0}, {1, 2, 0, 0}, {2, 0, 0, 0}, {1, 3, 0, 0}, {1, 2, 3, 4}, {2,4,0,0}, {3,0,0,0}, {3,4,0,0}, {4,0, 0,0}, {1, 5,0,0}, {1,2, 5, 6}, {2, 6,0,0}, {1, 3, 5, 7}, {2, 4, 6, 8}, {3, 7, 0, 0}, {3, 4, 7, 8}, {4, 8, 0, 0}, {5, 0, 0, 0}, {5, 6, 0, 0}, {6, 0, 0, 0}, {5, 7, 0, 0}, {5, 6, 7, 8}, {6, 8, 0, 0}, {7, 0, 0, 0}, {7, 8, 0, 0}, {8, 0, 0, 0}}.

Here, $th_4=2$, $th_5=5$, $th_6=2$, and $th_7=4$.

Further, the decoder determines a decoding model associated with the first prediction result, and parses an obtained bitstream based on the decoding model to obtain occupation information of the child node of the current node.

It is to be noted that, $l_{k,n}$ is a 26×4 LUT. the fourth number, $th_4$, $th_5$, $th_6$, and $th_7$ are theoretical optimal values set according to the probability statistics and calculation of an encoding/decoding result of a training set, and they are preset fixed values in the encoder/decoder, and need not to be transmitted by the encoder to the decoder. That is, the technical concepts of the method for intra prediction provided in the application at the encoder side and the decoder side are the same.

It can be understood that, except related operations for encoding at the encoder side and decoding at the decoder side, the operations for the intra prediction of the occupation information of the child node of the current node are the same.

Based on the method for intra prediction provided in the application, referring to FIG. 12, Table 1 shows what percentage of the code rate achieved by a PCC-based solution in the related art may be reduced under the same encoding quality in case of lossy compression. Here, there are 13 test sequences. It can be seen from Table 1 that, when each test sequence is processed by the method for intra prediction provided in the application, the bitstream may be reduced.

Referring to FIG. 13, Table 2 shows a size of a compressed bitstream in case of lossless compression. It can be seen from Table 2 that all compressed bitstreams are less than 100%, and the bitstream may be obtained by only part of the code rate in the related art.

The embodiments of the application may have the following beneficial effects. According to occupation information of a child node of an encoded/decoded node in 26 neighbouring nodes, when a certain child node of the current node is predicted, only influences of seven connected neighbour parent nodes adjoining the child node by a face, edge and corner are considered, thereby achieving the effect of reducing LUTs and the calculation complexity.

In addition, simple weight and threshold setting makes it easy to find an optimal solution, and under the optimal weight and threshold setting, the technology achieves the effect of reducing the code rate with the Peak Signal to Noise Ratio (PSNR) remaining unchanged.

Moreover, a spatial correlation of a point cloud is used more simply and accurately, so that an intra prediction result for octree-based geometric information coding is more suitable for the construction of a probability model in CABAC, and the binary bitstream is reduced.

Figure 14:
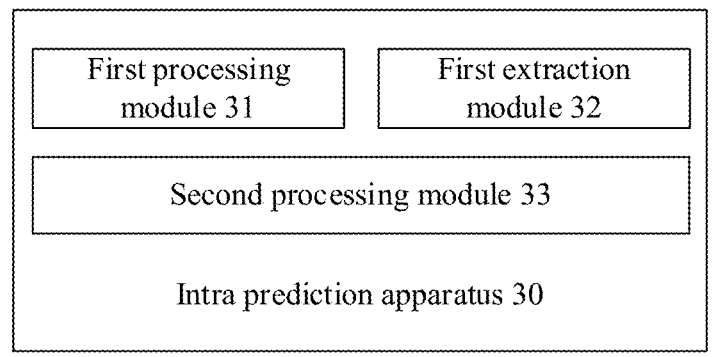
FIG. 14 is a structure diagram of an apparatus for intra prediction according to embodiments of the application.

FIG. 14 is a composition structure diagram of an apparatus for intra prediction according to embodiments of the application. As shown in FIG. 14, the apparatus for intra prediction 30 includes a first processing module 31, a first extraction module 32, and a second processing module 33.

The first processing module 31 is configured to obtain occupation information of a first number of neighbouring nodes of a current node in response to determining that a current level obtained by partitioning an input point cloud is lower than a target level.

The first extraction module 32 is configured to extract the occupation information of a second number of neighbouring nodes from the occupation information of the first number of neighbouring nodes, the first number being greater than the second number, and the second number of neighbouring nodes being in an association relationship with a child node of the current node.

The second processing module 33 is configured to perform intra prediction on occupation information of the child node of the current node based on the occupation information of the second number of neighbouring nodes to obtain a first prediction result.

In other embodiments, the association relationship includes that the second number of neighbouring nodes adjoin the child node of the current node by a face, edge and corner.

In other embodiments, the second processing module 33 is configured to determine an occupation number corresponding to the second number of neighbouring nodes of the current node is determined based on the occupation information of the second number of neighbouring nodes, and perform intra prediction on occupation information of the child node of the current node based on the occupation number to obtain the first prediction result, the first prediction result being used for indicating whether to perform prediction and a prediction value in case of performing prediction.

In other embodiments, the second processing module 33 is configured to obtain a third number associated with the second number, and perform intra prediction on occupation information of the child node of the current node based on the occupation number and the third number to obtain the first prediction result.

In other embodiments, the second processing module 33 is configured to perform, in response to determining that the occupation number is different from the third number, intra prediction on the occupation information of the child node of the current node based on the occupation number, a first threshold, and a second threshold to obtain the first prediction result.

In other embodiments, the second processing module 33 is configured to compare the occupation number with the first threshold in response to determining that the occupation number is different from the third number, and perform, in response to determining that the occupation number is less than or equal to the first threshold, intra prediction on the occupation information of the child node of the current node to obtain a first prediction result that the child node of the current node does not include point cloud.

In other embodiments, the second processing module 33 is configured to perform, in response to determining that the occupation number is greater than or equal to the second threshold, intra prediction on the occupation information of the child node of the current node to obtain a first prediction result that the child node of the current node includes point cloud.

In other embodiments, the second processing module 33 is configured to obtain, in response to determining that the occupation number is greater than the first threshold and less than the second threshold, a second prediction result that intra prediction is skipped for the occupation information of the child node of the current node.

In other embodiments, the second processing module 33 is configured to perform, in response to determining that the occupation number is the same as the third number, intra prediction on the occupation information of the child node of the current node based on the occupation number, a third threshold, and a fourth threshold to obtain the first prediction result.

In other embodiments, the second processing module 33 is configured to set weights of the occupation information of the second number of neighbouring nodes according to distances between the second number of neighbouring nodes of the current node and the child node in response to determining that the occupation number is the same as the third number, determine a target parameter of the child node based on the occupation information of the second number of neighbouring nodes and the weights corresponding to the occupation information of the second number of neighbouring nodes, and determine the first prediction result based on the target parameter, the third threshold, and the fourth threshold.

In other embodiments, the second processing module 33 is configured to perform, in response to determining that the target parameter is less than or equal to the third threshold, intra prediction on the occupation information of the child node of the current node to obtain a first prediction result that the child node of the current node does not include point cloud.

In other embodiments, the second processing module 33 is configured to perform, in response to determining that the target parameter is greater than or equal to the fourth threshold, intra prediction on the occupation information of the child node of the current node to obtain a first prediction result that the child node of the current node includes point cloud.

In other embodiments, the second processing module 33 is configured to obtain, in response to determining that the target parameter is greater than the third threshold and less than the fourth threshold, a second prediction result that intra prediction is skipped for the occupation information of the child node of the current node.

In another embodiment, the apparatus for intra prediction is an encoding apparatus. The encoding apparatus further includes a first determination module and an encoding module. The first determination module is configured to determine an encoding model associated with the first prediction result.

The encoding module is configured to encode the occupation information of the child node of the current node based on the encoding model and signals the occupation information of the child node of the current node based on the encoding model in a bitstream.

In other embodiments, the apparatus for intra prediction is a decoding apparatus. The decoding apparatus further includes a second determination module and a decoding module. The second determination module is configured to determine a decoding model associated with the first prediction result.

The decoding module is configured to parse an obtained bitstream based on the decoding model to obtain the occupation information of the child node of the current node.

In some embodiments of the application, the intra prediction apparatus includes a third processing module, a first obtaining module, and a fourth processing module.

The third processing module is configured to obtain occupation information of a first number of neighbouring nodes of a current node and first occupation numbers respective corresponding to each neighbouring node of the first number of neighbouring nodes in response to determining that a current level obtained by partitioning an input point cloud is lower than a target level.

The first obtaining module is configured to obtain second occupation numbers respective corresponding to each neighbouring node of a second number of neighbouring nodes, the first number being greater than the second number, and the second number of neighbouring nodes being in an association relationship with a child node of the current node.

The fourth processing module is configured to perform intra prediction on occupation information of the child node of the current node based on the occupation information of the first number of neighbouring nodes of the current node, the first occupation numbers, and the second occupation numbers to obtain a first prediction result.

In other embodiments, the second number of neighbouring nodes adjoin the child node of the current node by a face, edge and corner.

In other embodiments, the fourth processing module is configured to determine a first target occupation number of the first number of neighbouring nodes based on the occupation information of the first number of neighbouring nodes of the current node and the first occupation numbers, determine a second target occupation number of the second number of neighbouring nodes based on the occupation information of the first number of neighbouring nodes of the current node and the second occupation numbers, and perform intra prediction on the occupation information of the child node of the current node based on the first target occupation number and the second target occupation number to obtain the first prediction result.

In other embodiments, the fourth processing module is configured to obtain a fourth number associated with the first number, obtain a magnitude relationship between the fourth number and the first target occupation number, and perform intra prediction on the occupation information of the child node of the current node based on the magnitude relationship and the second target occupation number to obtain the first prediction result.

In other embodiments, the fourth processing module is configured to generate a first target threshold and a second target threshold in response to the magnitude relationship representing that the first target occupation number is greater than the fourth number, the first target threshold being less than the second target threshold, and perform, in response to determining that the second target occupation number is less than or equal to the first target threshold, intra prediction on the occupation information of the child node of the current node to obtain a first prediction result that the child node of the current node does not include any point cloud.

In other embodiments, the fourth processing module is configured to perform, in response to determining that the second target occupation number is greater than or equal to the second target threshold, intra prediction on the occupation information of the child node of the current node to obtain a first prediction result that the child node of the current node includes point cloud.

In other embodiments, the fourth processing module is configured to obtain, in response to determining that the second target occupation number is greater than the first target threshold and less than the second target threshold, a second prediction result that intra prediction is skipped for the occupation information of the child node of the current node.

In other embodiments, the fourth processing module is configured to generate a third target threshold and a fourth target threshold in response to the magnitude relationship representing that the first target occupation number is less than or equal to the fourth number, the third target threshold being less than the fourth target threshold, the third target threshold being equal to the second target threshold, and the fourth target threshold being less than the second target threshold, and perform, in response to determining that the second target occupation number is less than or equal to the third target threshold, intra prediction on the occupation information of the child node of the current node to obtain a first prediction result that the child node of the current node does not include point cloud.

In other embodiments, the fourth processing module is configured to perform, in response to determining that the second target occupation number is greater than or equal to the fourth target threshold, intra prediction on the occupation information of the child node of the current node to obtain a first prediction result that the child node of the current node includes point cloud.

In other embodiments, the fourth processing module is configured to obtain, in response to determining that the second target occupation number is greater than the third target threshold and less than the fourth target threshold, a second prediction result that intra prediction is skipped for the occupation information of the child node of the current node.

Figure 15:
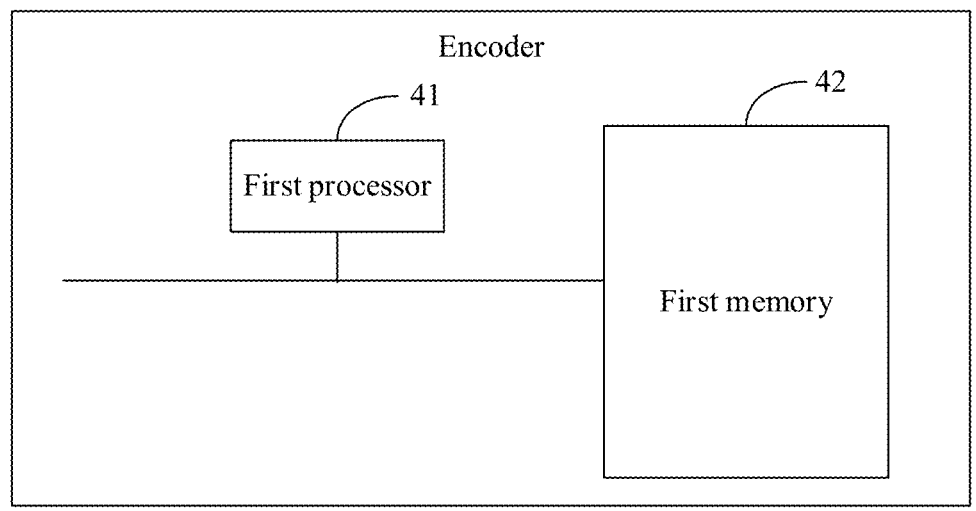
FIG. 15 is a structure diagram of an encoder according to embodiments of the application.

In practical applications, as shown in FIG. 15, embodiments of the application also provide a decoder, which includes a second memory 51 and a second processor 52.

The first memory 41 is configured to store executable intra prediction instructions.

The first processor 42 is configured to execute the executable intra prediction instructions stored in the first memory 41 to implement the method for intra prediction for an encoding apparatus side in the embodiments of the application.

The processor may be implemented by software, hardware, firmware, or a combination thereof. The processor may execute the corresponding steps of the intra prediction method in the embodiment of the coding apparatus by use of a circuit, one or more Application Specific Integrated Circuits (ASICs), one or more general-purpose integrated circuits, one or more microprocessors, one or more programmable logic devices, or a combination of the above-mentioned circuits or devices, or another proper circuit or device.

It can be understood that occupation information of a first number of neighbouring nodes of a current node is obtained in response to determining that a current level obtained by partitioning an input point cloud is lower than a target level. The occupation information of a second number of neighbouring nodes is extracted from the occupation information of the first number of neighbouring nodes, the first number being greater than the second number, and the second number of neighbouring nodes being in an association relationship with a child node of the current node. Intra prediction is performed on occupation information of the child node of the current node based on the occupation information of the second number of neighbouring nodes to obtain a first prediction result.

That is, in the embodiments of the application, when intra prediction is performed on the occupation information of the child node of the current node, only the second number of neighbouring nodes in an association relationship with the child node of the current node are considered. Therefore, the aims of reducing LUTs and the calculation complexity, improving the accuracy of an intra prediction result, shortening the encoding/decoding time, and improving the encoding/decoding accuracy are fulfilled.

Figure 16:
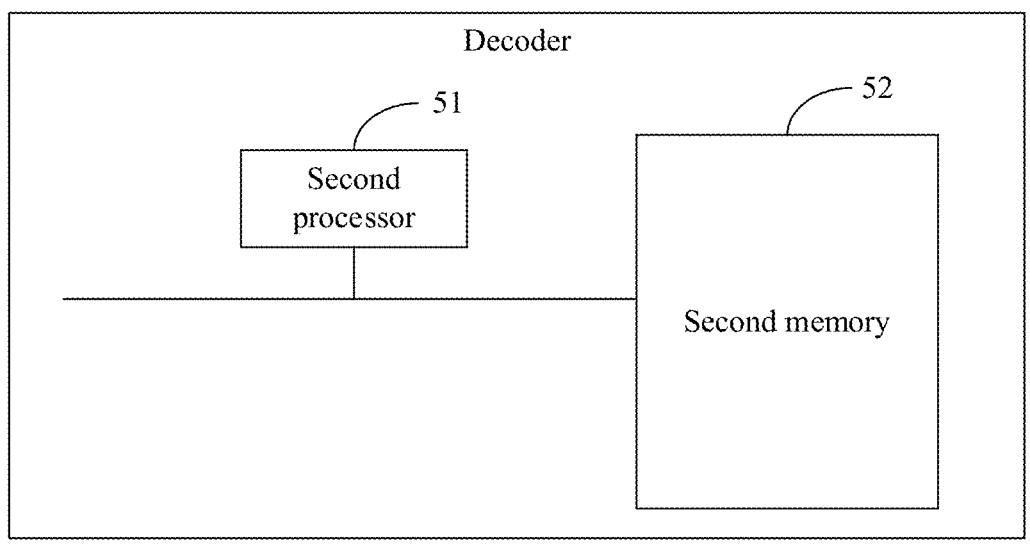
FIG. 16 is a structure diagram of a decoder according to embodiments of the application.

In practical applications, as shown in FIG. 16, embodiments of the application also provide a decoder, which includes a second memory 51 and a second processor 52.

The second memory 51 is configured to store executable intra prediction instructions.

The second processor 52 is configured to execute the executable intra prediction instructions stored in the second memory 51 to implement the method for intra prediction for a decoding apparatus side in the embodiments of the application.

The processor may be implemented by software, hardware, firmware, or a combination thereof. The processor may execute the corresponding steps of the intra prediction method in the embodiment of the decoding apparatus by use of a circuit, one or more ASICs, one or more general-purpose integrated circuits, one or more microprocessors, one or more programmable logic devices, or a combination of the above-mentioned circuits or devices, or another proper circuit or device.

It can be understood that occupation information of a first number of neighbouring nodes of a current node is obtained in response to determining that a current level obtained by partitioning an input point cloud is lower than a target level. The occupation information of a second number of neighbouring nodes is extracted from the occupation information of the first number of neighbouring nodes, the first number being greater than the second number, and the second number of neighbouring nodes being in an association relationship with a child node of the current node. Intra prediction is performed on occupation information of the child node of the current node based on the occupation information of the second number of neighbouring nodes to obtain a first prediction result.

That is, in the embodiments of the application, when intra prediction is performed on the occupation information of the child node of the current node, only the second number of neighbouring nodes in an association relationship with the child node of the current node are considered. Therefore, the aims of reducing LUTs and the calculation complexity, improving the accuracy of an intra prediction result, shortening the encoding/decoding time, and improving the encoding/decoding accuracy are fulfilled.

Each component in the embodiments of the disclosure may be integrated into a processing unit. Alternatively, each unit may physically exist independently. Alternatively, two or more than two units may be integrated into a unit. The integrated unit may be implemented in a hardware form, or in form of a software function module.

When being implemented in form of a software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of a software product. The computer software product is stored in a storage medium, including a plurality of instructions for enabling a computer device (which may be a personal computer, a server, a network device, or the like) or a processor to execute all or part of the steps of the method in the embodiment. The storage medium may include various media capable of storing program codes, such as a Ferromagnetic Random Access Memory (FRAM), a Read Only Memory (ROM), a Programmable ROM (PROM), an Erasable PROM (EPROM), an Electrically EPROM (EEPROM), a flash memory, a magnetic surface memory, a compact disc, or a Compact Disc Read-Only Memory (CD-ROM). No limits are made in the embodiment of the disclosure.

Embodiments of the application also provide a computer-readable storage medium, which stores executable intra prediction instructions executed by a first processor to implement a method for intra prediction for an encoder side in the embodiments of the application.

Embodiments of the application also provide a computer-readable storage medium, which stores an executable intra prediction instruction executed by a second processor to implement a method for intra prediction for a decoder side in the embodiments of the application.

INDUSTRIAL APPLICABILITY

The embodiments of the application provide an method and apparatus for intra prediction, an encoder, a decoder, and a storage medium. Occupation information of a first number of neighbouring nodes of a current node and first occupation numbers respective corresponding to each neighbouring node of the first number of neighbouring nodes are obtained in response to determining that a current level obtained by partitioning an input point cloud is lower than a target level. Second occupation numbers respective corresponding to each neighbouring node in a second number of neighbouring nodes are obtained, the first number being greater than the second number, and the second number of neighbouring nodes being in an association relationship with a child node of the current node. Intra prediction is performed on occupation information of the child node of the current node based on the occupation information of the first number of neighbouring nodes of the current node, the first occupation numbers, and the second occupation numbers to obtain a first prediction result. That is, in the embodiments of the application, during intra prediction over occupation information of a child node of a current node, according to occupation information of child nodes of encoded/decoded nodes in the first number of neighbouring nodes, when a certain child node of the current node is predicted, only influences of multiple connected neighbour parent nodes in an association relationship with the child node, for example, adjoining the child node by a face, edge and corner, are considered. Therefore, the effects of reducing LUTs and the calculation complexity are achieved, the coding time is shortened, and the coding efficiency and the coding accuracy are improved.

What is claimed is:

1. A method for intra prediction, applied to an encoder, comprising:
    enabling intra prediction, and determining occupation information of a first number of neighbouring nodes of a current node;
    determining occupation information of a second number of neighbouring nodes from the occupation information of the first number of neighbouring nodes of the current node according to a position relationship between at least one neighbouring node of the current node and a child node of the current node, the first number being greater than the second number, wherein the position relationship comprises that the at least one neighbouring node of the current node adjoins the child node of the current node by a face, edge or corner; and
    determining an occupation prediction result of the child node of the current node based on the occupation information of the first number of neighbouring nodes of the current node and the occupation information of the second number of neighbouring nodes.

2. The method of claim 1, wherein the determining an occupation prediction result of the child node of the current node based on the occupation information of the first number of neighbouring nodes of the current node and the occupation information of the second number of neighbouring nodes comprises:
    determining a first target occupation number of the first number of neighbouring nodes based on the occupation information of the first number of neighbouring nodes of the current node;
    determining a second target occupation number of the second number of neighbouring nodes based on the occupation information of the second number of neighbouring nodes; and
    determining the occupation prediction result of the child node of the current node based on the first target occupation number and the second target occupation number.

3. The method of claim 2, wherein the determining the occupation prediction result of the child node of the current node based on the first target occupation number and the second target occupation number comprises:
  determining a magnitude relationship between a fourth number and the first target occupation number, the fourth number being less than the first number; and
  determining the occupation prediction result of the child node of the current node based on the magnitude relationship and the second target occupation number.

4. The method of claim 3, wherein the determining the occupation prediction result of the child node of the current node based on the magnitude relationship and the second target occupation number comprises:
  in response to the magnitude relationship representing that the first target occupation number is greater than the fourth number, determining a second target threshold;
  in response to the second target occupation number being less than or equal to a first target threshold, determining that the occupation prediction result of the child node of the current node is the child node does not comprise point, the first target threshold being less than the second target threshold;
  in response to the second target occupation number being greater than or equal to the second target threshold, determining that the occupation prediction result of the child node of the current node is the child node comprises point; and
  in response to the second target occupation number being greater than the first target threshold and less than the second target threshold, determining that the occupation prediction result of the child node of the current node is intra prediction is skipped for the occupation information of the child node.

5. The method of claim 4, wherein the determining the occupation prediction result of the child node of the current node based on the magnitude relationship and the second target occupation number comprises:
  in response to the magnitude relationship representing that the first target occupation number is less than or equal to the fourth number, determining a fourth target threshold, the fourth target threshold being less than the second target threshold;
  in response to the second target occupation number being less than or equal to a third target threshold, determining that the occupation prediction result of the child node of the current node is the child node does not comprise point, the third target threshold being less than the fourth target threshold, and the third target threshold being equal to the first target threshold;
  in response to the second target occupation number being greater than or equal to the fourth target threshold, determining that the occupation prediction result of the child node of the current node is the child node comprises point; and
  in response to the second target occupation number being greater than the third target threshold and less than the fourth target threshold, determining that the occupation prediction result of the child node of the current node is intra prediction is skipped for the occupation information of the child node.

6. The method of claim 1, further comprising:
  determining an encoding model associated with the occupation prediction result; and
  encoding the occupation information of the child node of the current node based on the encoding model, and signalling the occupation information of the child node of the current node based on the encoding model in a bitstream.

7. A method for intra prediction, applied to a decoder, comprising:
  enabling intra prediction, and determining occupation information of a first number of neighbouring nodes of a current node;
  determining occupation information of a second number of neighbouring nodes of the current node according to a position relationship between at least one neighbouring node of the current node and a child node of the current node, the first number being greater than the second number, wherein the position relationship comprises that the at least one neighbouring node of the current node adjoins the child node of the current node by a face, edge or corner; and
  determining an occupation prediction result of the child node of the current node based on the occupation information of the first number of neighbouring nodes of the current node and the occupation information of the second number of neighbouring nodes.

8. The method of claim 7, wherein the determining an occupation prediction result of the child node of the current node based on the occupation information of the first number of neighbouring nodes of the current node and the occupation information of the second number of neighbouring nodes comprises:
  determining a first target occupation number of the first number of neighbouring nodes based on the occupation information of the first number of neighbouring nodes of the current node;
  determining a second target occupation number of the second number of neighbouring nodes based on the occupation information of the second number of neighbouring nodes; and
  determining the occupation prediction result of the child node of the current node based on the first target occupation number and the second target occupation number.

9. The method of claim 8, wherein the determining the occupation prediction result of the child node of the current node based on the first target occupation number and the second target occupation number comprises:
  determining a magnitude relationship between a fourth number and the first target occupation number, the fourth number being less than the first number; and
  determining the occupation prediction result of the child node of the current node based on the magnitude relationship and the second target occupation number.

10. The method of claim 9, wherein the determining the occupation prediction result of the child node of the current node based on the magnitude relationship and the second target occupation number comprises:
  in response to the magnitude relationship representing that the first target occupation number is greater than the fourth number, determining a second target threshold;
  in response to the second target occupation number being less than or equal to a first target threshold, determining that the occupation prediction result of the child node of the current node is the child node does not comprise point, the first target threshold being less than the second target threshold;
  in response to the second target occupation number being greater than or equal to the second target threshold, determining that the occupation prediction result of the child node of the current node is the child node comprises point; and in response to the second target occupation number being greater than the first target threshold and less than the second target threshold, determining that the occupation prediction result of the child node of the current node is intra prediction is skipped for the occupation information of the child node.

11. The method of claim 10, wherein the determining the occupation prediction result of the child node of the current node based on the magnitude relationship and the second target occupation number comprises:

in response to the magnitude relationship representing that the first target occupation number is less than or equal to the fourth number, determining a fourth target threshold, the fourth target threshold being less than the second target threshold;

in response to the second target occupation number being less than or equal to a third target threshold, determining that the occupation prediction result of the child node of the current node is the child node does not comprise point, the third target threshold being less than the fourth target threshold, and the third target threshold being equal to the first target threshold;

in response to the second target occupation number being greater than or equal to the fourth target threshold, determining that the occupation prediction result of the child node of the current node is the child node comprises point; and in response to the second target occupation number being greater than the third target threshold and less than the fourth target threshold, determining that the occupation prediction result of the child node of the current node is intra prediction is skipped for the occupation information of the child node.

12. The method of claim 7, further comprising:
determining a decoding model associated with the occupation prediction result; and
parsing an obtained bitstream based on the decoding model to obtain the occupation information of the child node of the current node.

13. A device for use in a decoder, the device comprises:
a memory, configured to store executable intra prediction instructions; and
a processor, configured to execute the executable intra prediction instructions stored in the memory to perform operations comprising:
determining occupation information of a first number of neighbouring nodes of a current node by enabling intra prediction;
determining occupation information of a second number of neighbouring nodes of the current node according to a position relationship between at least one neighbouring node of the current node and a child node of the current node, the first number being greater than the second number, wherein the position relationship comprises that the at least one neighbouring node of the current node adjoins the child node of the current node by a face, edge or corner; and
determining an occupation prediction result of the child node of the current node based on the occupation information of the first number of neighbouring nodes of the current node and the occupation information of the second number of neighbouring nodes.

14. The decoder of claim 13, wherein the operation of determining an occupation prediction result of the child node of the current node based on the occupation information of the first number of neighbouring nodes of the current node and the occupation information of the second number of neighbouring nodes comprises:

determining a first target occupation number of the first number of neighbouring nodes based on the occupation information of the first number of neighbouring nodes of the current node;

determining a second target occupation number of the second number of neighbouring nodes based on the occupation information of the second number of neighbouring nodes; and determining the occupation prediction result of the child node of the current node based on the first target occupation number and the second target occupation number.

15. The decoder of claim 14, wherein the operation of determining the occupation prediction result of the child node of the current node based on the first target occupation number and the second target occupation number comprises:

determining a magnitude relationship between a fourth number and the first target occupation number, the fourth number being less than the first number; and determining the occupation prediction result of the child node of the current node based on the magnitude relationship and the second target occupation number.

16. The decoder of claim 15, wherein the operation of determining the occupation prediction result of the child node of the current node based on the magnitude relationship and the second target occupation number comprises:

in response to the magnitude relationship representing that the first target occupation number is greater than the fourth number, determining a second target threshold;

in response to the second target occupation number being less than or equal to a first target threshold, determining that the occupation prediction result of the child node of the current node is the child node does not comprise point, the first target threshold being less than the second target threshold;

in response to the second target occupation number being greater than or equal to the second target threshold, determining that the occupation prediction result of the child node of the current node is the child node comprises point; and in response to the second target occupation number being greater than the first target threshold and less than the second target threshold, determining that the occupation prediction result of the child node of the current node is intra prediction is skipped for the occupation information of the child node.

17. The decoder of claim 16, wherein the operation of determining the occupation prediction result of the child node of the current node based on the magnitude relationship and the second target occupation number comprises:

in response to the magnitude relationship representing that the first target occupation number is less than or equal to the fourth number, determining a fourth target threshold, the fourth target threshold being less than the second target threshold;

in response to the second target occupation number being less than or equal to a third target threshold, determining that the occupation prediction result of the child node of the current node is the child node does not comprise point, the third target threshold being less than the fourth target threshold, and the third target threshold being equal to the first target threshold;

in response to the second target occupation number being greater than or equal to the fourth target threshold, determining that the occupation prediction result of the child node of the current node is the child node comprises point; and in response to the second target occupation number being greater than the third target threshold and less than the fourth target threshold, determining that the occupation prediction result of the child node of the current node is intra prediction is skipped for the occupation information of the child node.

\* \* \* \* \*